(12) United States Patent
Kharatishvili et al.

(10) Patent No.: US 9,946,735 B2
(45) Date of Patent: Apr. 17, 2018

(54) INDEX STRUCTURE NAVIGATION USING PAGE VERSIONS FOR READ-ONLY NODES

(71) Applicant: Amazon Technologies, Inc., Seattle, WA (US)

(72) Inventors: Tengiz Kharatishvili, Sammamish, WA (US); Pradeep Jnana Madhavarapu, Mountain View, CA (US); Anurag Windlass Gupta, Atherton, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 15/376,386

(22) Filed: Dec. 12, 2016

(65) Prior Publication Data

US 2017/0091226 A1    Mar. 30, 2017

Related U.S. Application Data

(63) Continuation of application No. 14/032,721, filed on Sep. 20, 2013, now Pat. No. 9,519,664.

(51) Int. Cl.
  *G06F 17/30*    (2006.01)

(52) U.S. Cl.
  CPC .. *G06F 17/30283* (2013.01); *G06F 17/30356* (2013.01); *G06F 17/30368* (2013.01); *G06F 17/30578* (2013.01)

(58) Field of Classification Search
  CPC ......... G06F 17/30283; G06F 17/30356; G06F 17/30368; G06F 17/30578

(Continued)

(56) References Cited

U.S. PATENT DOCUMENTS

| 5,280,612 A | * | 1/1994 | Lorie | ................. | G06F 17/30356 |
| 5,287,496 A | * | 2/1994 | Chen | ................. | G06F 17/30356 |

(Continued)

FOREIGN PATENT DOCUMENTS

| EP | 0501160 | 9/1992 |
| EP | 0675451 | 10/1995 |

(Continued)

OTHER PUBLICATIONS

U.S. Appl. No. 14/032,721, filed Sep. 20, 2013, Tengiz Kharatishvili et al.

(Continued)

*Primary Examiner* — Thanh-Ha Dang
(74) *Attorney, Agent, or Firm* — Robert C. Kowert; Meyertons, Hood, Kivlin, Kowert & Goetzel, P.C.

(57) ABSTRACT

Read-only nodes of a distributed database system may implement index structure navigation using page versions. A read request may be received at a read only node of a distributed database for select data. Data pages linked together to form an index structure for data stored for the distributed database may be navigated according to versions maintained for the data pages in order to identify one or more locations to access for the select data. One or more prior versions of data pages may be selected as part navigating the index structure according to a consistent view of the distributed database associated with the read request. Change notifications may also be received at the read-only node modifying the data pages of the index structure. The index structure modifications may be applied without blocking the index structure navigation for servicing the read request.

20 Claims, 10 Drawing Sheets

(58) Field of Classification Search
USPC .......................................................... 707/830
See application file for complete search history.

(56) References Cited

U.S. PATENT DOCUMENTS

| | | | |
|---|---|---|---|
| 5,317,731 A * | 5/1994 | Dias | G06F 17/30348 |
| 5,471,614 A | 11/1995 | Kakimoto | |
| 5,524,205 A | 6/1996 | Lomet et al. | |
| 5,530,850 A | 6/1996 | Ford et al. | |
| 5,806,065 A | 9/1998 | Lomet | |
| 5,870,758 A | 2/1999 | Bamford et al. | |
| 5,907,848 A | 5/1999 | Zaiken et al. | |
| 6,233,585 B1 | 5/2001 | Gupta et al. | |
| 6,240,413 B1 | 5/2001 | Learmont | |
| 6,351,753 B1* | 2/2002 | Jagadish | G06F 17/30356 |
| 6,615,219 B1 | 9/2003 | Bruso et al. | |
| 6,631,374 B1 | 10/2003 | Klein et al. | |
| 6,732,171 B2 | 5/2004 | Hayden | |
| 6,832,229 B2 | 12/2004 | Reed | |
| 6,976,022 B2 | 12/2005 | Vemuri et al. | |
| 7,010,645 B2 | 3/2006 | Hetzler et al. | |
| 7,089,256 B2 | 8/2006 | Hinshaw et al. | |
| 7,146,386 B2 | 12/2006 | Xiao | |
| 7,243,088 B2* | 7/2007 | Verma | G06F 9/466 |
| | | | 707/695 |
| 7,305,386 B2 | 12/2007 | Hinshaw et al. | |
| 7,308,456 B2 | 12/2007 | Friske et al. | |
| 7,403,942 B1 | 7/2008 | Bayliss | |
| 7,657,540 B1 | 2/2010 | Bayliss | |
| 7,716,645 B2 | 5/2010 | Dolby et al. | |
| 7,720,846 B1 | 5/2010 | Bayliss | |
| 7,747,663 B2 | 6/2010 | Atkin et al. | |
| 7,885,922 B2 | 2/2011 | Pareek et al. | |
| 7,912,842 B1 | 3/2011 | Bayliss | |
| 7,930,271 B2 | 4/2011 | Tarbell | |
| 7,937,551 B2 | 5/2011 | Schott | |
| 7,979,670 B2 | 7/2011 | Saliba et al. | |
| 7,984,043 B1* | 7/2011 | Waas | G06F 17/30932 |
| | | | 707/718 |
| 8,060,534 B1* | 11/2011 | Ansari | H04L 29/12264 |
| | | | 707/794 |
| 8,209,515 B2 | 6/2012 | Schott | |
| 8,255,627 B2 | 8/2012 | Blinick et al. | |
| 8,266,114 B2 | 9/2012 | Mace et al. | |
| 8,271,830 B2 | 9/2012 | Erofeev | |
| 8,289,801 B2 | 10/2012 | Smith et al. | |
| 8,301,670 B2 | 10/2012 | Revah et al. | |
| 8,326,897 B2 | 12/2012 | Butterworth et al. | |
| 8,341,128 B1 | 12/2012 | Ruggiero | |
| 8,370,715 B2 | 2/2013 | Hafner et al. | |
| 8,380,670 B2 | 2/2013 | Kuber et al. | |
| 8,392,479 B1 | 3/2013 | Pantin | |
| 8,396,831 B2 | 3/2013 | Larson et al. | |
| 8,412,689 B2 | 4/2013 | Reid et al. | |
| 8,412,752 B2 | 4/2013 | Dodge | |
| 8,429,121 B2 | 4/2013 | Pareek et al. | |
| 8,533,169 B1* | 9/2013 | Bailey | G06F 17/30309 |
| | | | 707/610 |
| 9,280,591 B1 | 3/2016 | Kharatishvili et al. | |
| 9,389,905 B2* | 7/2016 | Shen | G06F 9/466 |
| 2002/0107835 A1 | 8/2002 | Coram et al. | |
| 2002/0143733 A1 | 10/2002 | Mukkamlla et al. | |
| 2004/0098359 A1 | 5/2004 | Bayliss et al. | |
| 2004/0098371 A1 | 5/2004 | Bayliss et al. | |
| 2004/0098372 A1 | 5/2004 | Bayliss et al. | |
| 2004/0098373 A1 | 5/2004 | Bayliss et al. | |
| 2004/0098374 A1 | 5/2004 | Bayliss et al. | |
| 2004/0098390 A1 | 5/2004 | Bayliss et al. | |
| 2004/0133622 A1 | 7/2004 | Clubb et al. | |
| 2004/0249869 A1 | 12/2004 | Oksanen | |
| 2005/0120036 A1* | 6/2005 | Verma | G06F 17/30227 |
| 2007/0288534 A1 | 12/2007 | Zak et al. | |
| 2008/0183973 A1 | 7/2008 | Aguilera et al. | |
| 2009/0240664 A1 | 9/2009 | Gogulapati et al. | |
| 2010/0050172 A1 | 2/2010 | Ferris | |
| 2010/0106753 A1* | 4/2010 | Prabhakaran | G06F 17/30371 |
| | | | 707/818 |
| 2010/0174802 A1* | 7/2010 | Chan | G06F 17/30362 |
| | | | 709/219 |
| 2010/0192131 A1 | 7/2010 | Dolby et al. | |
| 2011/0035548 A1 | 2/2011 | Kimmel et al. | |
| 2011/0161496 A1 | 6/2011 | Nicklin | |
| 2012/0005196 A1 | 1/2012 | Horii | |
| 2012/0041899 A1 | 2/2012 | Greene et al. | |
| 2012/0150917 A1* | 6/2012 | Sundaram | G06F 17/30377 |
| | | | 707/803 |
| 2012/0158650 A1* | 6/2012 | Andre | G06F 17/30575 |
| | | | 707/611 |
| 2012/0166407 A1* | 6/2012 | Lee | G06F 9/466 |
| | | | 707/703 |
| 2012/0174112 A1 | 7/2012 | Vaidya et al. | |
| 2012/0191648 A1 | 7/2012 | Kuber et al. | |
| 2012/0271795 A1* | 10/2012 | Rao | G06F 17/30345 |
| | | | 707/613 |
| 2012/0310985 A1 | 12/2012 | Gales et al. | |
| 2012/0310986 A1 | 12/2012 | Frantz et al. | |
| 2012/0310991 A1 | 12/2012 | Frantz et al. | |
| 2013/0036281 A1 | 2/2013 | Revah et al. | |
| 2013/0042156 A1 | 2/2013 | Srinivasan et al. | |
| 2013/0080386 A1 | 3/2013 | Dwyer et al. | |
| 2013/0080388 A1 | 3/2013 | Dwyer et al. | |
| 2013/0086129 A1 | 4/2013 | Brown et al. | |
| 2014/0136498 A1* | 5/2014 | Finis | G06F 17/30356 |
| | | | 707/695 |
| 2014/0280375 A1* | 9/2014 | Rawson | G06F 17/30289 |
| | | | 707/803 |
| 2015/0032775 A1* | 1/2015 | Yang | G06F 17/30551 |
| | | | 707/770 |

FOREIGN PATENT DOCUMENTS

| | | |
|---|---|---|
| JP | H10-254748 | 9/1998 |
| JP | 2012014502 | 1/2012 |

OTHER PUBLICATIONS

"Amazon Web Services Blog" Downloaded Apr. 30, 2013 from http://aws.typepad.com/aws/2010/10/amazon-rdsannouncing-read-replicas.html, Published Oct. 5, 2010 pp. 1-11.
"Bloom Filter" Downloaded from http://en.wikipedia.org/wiki/Bloom_filter on May 15, 2013, pp. 1-12.
John Clarke "SQL Result Set Cache in Oracle 11 gR2" published Nov. 16, 2011 downloaded May 15, 2013 from http://www.centroid.com/knowledgebase/blog/sql-result-set-cache-in-oracle-11 gr2, pp. 1-27.
Jim Czuprynski "Oracle Database 11g: SQL Query Result Set Caching" published Jul. 30, 2008, downloaded May 15, 2013 from http://www.databasejournal.com/features/oracle/article.php/3760761/Oracle-Database-11 g-SQL -Query-Result-Set-Caching.htm, pp. 1-7.
"Oracle Database JDBC Developer's Guide and Reference: Chapter 20 Statement and Result Set Caching" downloaded from http://docs.oracle.com/cd/B28359_01/java.1111b31224/stmtcach.htm via the Wayback Machine Nov. 27, 2011, pp. 1-8.
Adrian Billington "Query Result Cache in Oracle 11g" downloaded from http://web.archive.org/web/20080124161135/http://www.oracle-developer.net/display.php?id=503 via the Wayback Machine Jan. 4, 2008, pp. 1-20.
Julian Dontcheff "Bloom Filters for DBAs" published Aug. 28, 2012, downloaded from http://juliandontcheff.wordpress.com/2012/08/28/bloom-filters-for-dbas/ on May 14, 2013, pp. 1-4.
Julian Dyke "Result Cache Internals" Nov. 2007, pp. 1-38.
Michele Cyran et al "Oracle Database Concepts 10g Release 2 (10.2)" Oct. 2005, pp. 1-542.
Lance Ashdown et al "Oracle Database Concepts 11 g Release 2 (11.2)" Sep. 2011, pp. 1-460.
"Isolation (database systems)" downloaded from http://en.wikipedia.org/wiki/Isolation_(database_systems) on May 15, 2013, pp. 1-7.

(56) References Cited

OTHER PUBLICATIONS

U.S. Appl. No. 61/794,572, filed Mar. 15, 2013, Anurag Windlass Gupta, et al.
U.S. Appl. No. 61/799,609, filed Mar. 15, 2013, Anurag Windlass Gupta, et al.
U.S. Appl. No. 61/794,612, filed Mar. 15, 2013, Pradeep Jnana Madhavarapu et al.
U.S. Appl. No. 61/794,658, filed Mar. 15, 2013, Anurag Windlass Gupta, et al.
U.S. Appl. No. 61/799,632, filed Mar. 15, 2013, Anurag Windlass Gupta, et al.
U.S. Appl. No. 13/892,027, filed May 10, 2013, Anurag Windlass Gupta, et al.
U.S. Appl. No. 13/873,467, filed Apr. 30, 2013, Anurag Windlass Gupta, et al.
U.S. Appl. No. 13/902,381, filed May 24, 2013, Anurag Windlass Gupta, et al.
U.S. Appl. No. 13/893,004, filed May 13, 2013, Laurion Darrell Burchall et al.
U.S. Appl. No. 13/901,111, filed May 23, 2013, Anurag Windlass Gupta, et al.
U.S. Appl. No. 13/894,969, filed May 15, 2013, Grant Alexander MacDonald McAlister et al.
U.S. Appl. No. 13/903,674, filed May 28, 2013, Anurag Windlass Gupta, et al.
U.S. Appl. No. 14/033,343, filed Sep. 20, 2013, Tengiz Kharatishvili et al.
U.S. Appl. No. 14/032,797, filed Sep. 20, 2013, Pradeep Jnana Madhavarapu et al.
U.S. Appl. No. 14/036,783, filed Sep. 25, 2013, Anurag Windlass Gupta, et al.
U.S. Appl. No. 14/036,792, filed Sep. 25, 2013, Samuel James McKelvie, et al.
U.S. Appl. No. 14/032,763, filed Sep. 20, 2013, Yan Valerie Leshinsky et al.
U.S. Appl. No. 14/032,681, filed Sep. 20, 2013, Samuel James McKelvie, et al.
Neeta Garimella, "Understanding and exploiting snapshot technology for data protection, Part 1: Snapshot technology overview", IBM developerWorks, Apr. 26, 2006, Retrieved from URL: https://web.archive.org/web/20070125115155/http://www-128.ibm.com/developerworks/tivoli/library/t-snaptsm1/index.html, pp. 1-7.

* cited by examiner

| LSN | P1 | P2 |
|---|---|---|
| ... | | |
| ... | | |
| 9 | | |
| 10 | | |
| 11 | T1 | T1 |
| 12 | | |
| 13 | | |
| 14 | | T2 |
| 15 | | |
| 16 | | |
| 17 | T3 | |
| 18 | | |
| ... | | |
| ... | | |

FIG. 8B

INDEX STRUCTURE NAVIGATION USING PAGE VERSIONS FOR READ-ONLY NODES

This application is a continuation of U.S. patent application Ser. No. 14/032,721, filed Sep. 20, 2013, now U.S. Pat. No. 9,519,664, which is hereby incorporated by reference herein in its entirety.

This application incorporates by reference U.S. application Ser. No. 14/033,343 (now U.S. Pat. No. 9,280,591), entitled "Efficient Replication of System Transactions for Read-Only Nodes of a Distributed Database," Sep. 20, 2013.

BACKGROUND

Distributed database systems offer a host of advantages to users. For example, distributed database systems provide opportunities to balance the workload performed among different nodes, systems, or devices, in order to optimize various different functions, such as performing read or write requests. Risk of failure may be dispersed among different nodes so that one or more individual failures may be tolerated in the distributed database system. Additionally, distributed database systems may be scaled more easily than traditional monolithic database systems in order to account for growing computational and other resource demands. In the face of these appealing benefits, various different implementation challenges for distribute database systems must be overcome. Coordination problems between various nodes can, for example, occur, especially when operating on a common set of data.

A read replica model is one example architecture of a distributed database system that is used to scale out read processing. According to a typical read replica model, as changes are made to the structure of the database, a SQL record may be created in a logical replication log which may then be propagated to all the replicas. Each replica would then run these SQL statements locally on their own versions of the database. Logs are generally shipped asynchronously, causing the read replica to operate at some lag from the primary database.

BRIEF DESCRIPTION OF THE DRAWINGS

FIG. 8B is a logical example of evaluating page versions to determine a version of a destination page consistent with a version of a current page, according to some embodiments.

Figure 1A:
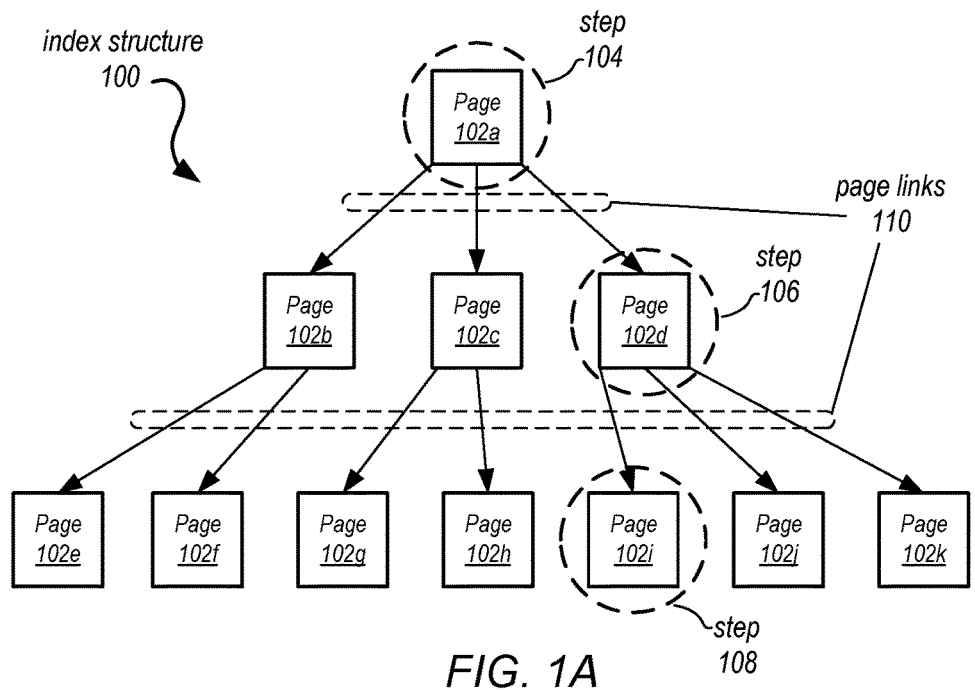
FIGS. 1A and 1B are logical diagrams of index structure navigation using page versions for read-only nodes, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of index structure navigation using page versions for read-only replicas of a distributed database system are disclosed. Various ones of the present embodiments may include a read-write node (or "leader," "master," or "primary" node) of a database service receiving, from a client of the database service, an update, such as a write request, that specifies a modification to be made to data maintained by the distributed database. The read-write node may then perform the requested update. Writes, changes, or updates to data may alter, change, or modify one or more index structures that organize the data. For example, inserting a new row in a database table may modify an index structure, such as a b-tree, to include the new row in the index. In at least some embodiments, multiple modifications may be made to an index structure, which may not correlate with a number of changes made to the data. The read-write node may send notifications of index structure modifications to read-only nodes (sometimes referred to as read-replicas). In this way, the read-only nodes may maintain a local replica of the index structure for data stored for the distributed database that is consistent with updates to the index structure at the read-write node.

Change notifications, such as log records or other indications of changes made to an index structure (e.g., changes made to data pages which compose the index structure), may be applied, maintained, or stored at a read-only node as they are received, in some embodiments. While change notifications are received, stored, or applied at the read-only node, read requests may also be received. A read-only node may use the local replica of the index structure maintained at the read-only node in order to locate data for servicing a read request. However, change notifications received at the read-only node may modify the index structure while the read-only node is also trying to service the read request by navigating the portions of the index structure that are being modified. Typical index structure navigation may implement a concurrency mechanism, such as acquiring a lock for a data page that is part of the index structure, before the data page may be traversed (i.e. read). Locking data pages, however, may block read requests from being serviced, as the process servicing the read request may have to wait until a process updating the index structure data page has finished (e.g., released the lock). Some concurrency mechanisms may require multiple locks leading, in some cases, to deadlock scenarios.

Figure 1B:
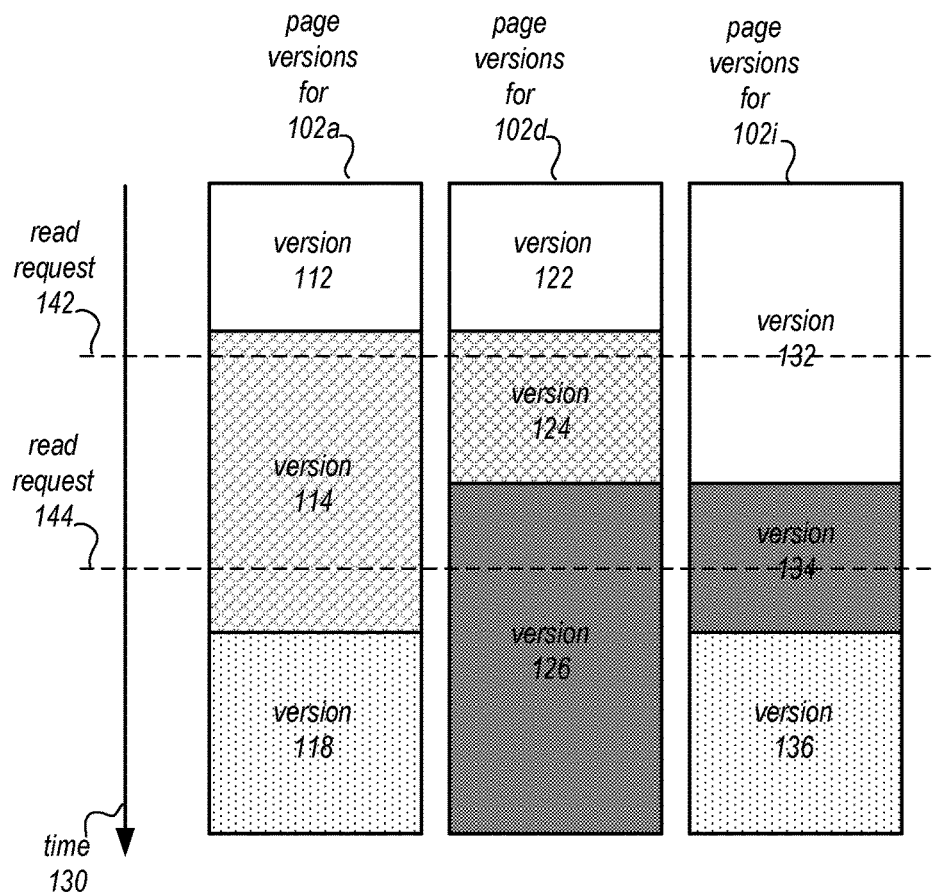

In various embodiments, index structure navigation may occur without blocking (or locking) processes servicing read requests from accessing data pages of the index structure. Page versions may be used to implement navigation from one data page on an index structure to the next. A page version may be a copy or replica of page (or one or more records, notifications, or other indicators that describe the page) as it was maintained for an interval of time. For example, in some embodiments read-only nodes may implement multi-version concurrency control in order to maintain different versions for data pages. FIGS. 1A and 1B are logical diagrams of index structure navigation using page versions for read-only nodes, according to some embodiments.

As noted above, in order to service a read request, a read-only node may access an index structure, such as index structure 100, maintained at the read-only node in order to determine locations to access in order to service the read request for the select data. Index structure may be a tree structure (e.g., b-tree or b+ tree), such as illustrated in FIG. 1A. However, various other index structures may be envisioned, and thus the tree illustrated in FIG. 1A is not intended to be limiting. Index structure 100 may be maintained on one or more data pages, such as page 102a, 102b, 102c, 102d, 102e, 102f, 102g, 102h, 102i, 102j, and 102k (which may also be referred to as index pages or index data pages). Different index structures may be optimized for locating different types or combinations of data. Some index structures, for example, may be optimized for searching for unique or near-unique values (e.g., table primary keys). While other index structures may be optimized for searching for similar values or values with low entropy. In some embodiments, multiple index structures may be maintained (e.g., a database table may have an index for different column values).

In some embodiments, data pages 102 of an index structure may be linked together in order to provide a structure, scheme, or other arrangement for locating stored data. Different types of index structures may provide links between different pages, such as page links 110, which may be traversed in order to search for locations of (or the data itself) data for servicing a read request. For example, in a b-tree structure each page may include links to other pages that provide locations of a range of certain data values, while a b+ tree may store client data in some of the data pages in the index structure.

While servicing a read request, the values of pages 102, such as the pointers or links between pages 110, may be modified, as a result of write requests performed at a read-write node. Change notifications indicating these changes may be streamed to the read-only node, creating, generating, or maintaining different versions pages 102. These changes may be referred to as index structure modifications. The nature of the modifications to index structure 100 may depend on the scheme of index structure 100. For example, a b-tree index structure may maintain certain ranges of values at each data page 102. If a new value is to be inserted, the values of one data page may be split off and moved into another or a new data page. Changes in the location of values may alter the links between data pages as well. If a read-only node is currently traversing an index structure as the index structure is being changed, then a current or destination data page may no longer maintain the values that were indicated in data page that had linked to it.

Index structure navigation may be performed based, at least in part, on page versions for the different pages 102. For example, a read request is received, and index structure 100 is to be traversed in order to locate data pages storing data for servicing the read request. At step 104, the root page of the index structure, page 102a, may be read as the current page. Based on a version of the current page, 102a, that is associated with the view of the database at the time of the read request, a destination page to move to from the current page 102a may be selected. FIG. 1B illustrates various different versions for pages 102a, 102b, and 102c as version intervals over time 130. For example, one version of page 102a indicated is version 112. Similarly, a subsequent version of page 102a is version 114, and another version is version 118.

In the example illustrated in FIG. 1A, page 102d may be selected as the destination page using the version of page 102a associated with the read request. A version of 102a associated with the read request may be the version of page 102a at the time the read request was received or, in another example, be the version of page 102a that is associated with a specific time (even if it may be different from when the read request was received). FIG. 1B provides various examples of the relationship of a read request to versions of data pages. Read request 142, for example, may be associated with a particular view of the database in time 130. Thus, if the database were implemented in a log-structured environment, read request 142 may be associated with a view of the database at a particular log sequence number (LSN). Using the version of current page 102a associated with the read request, page 102a may indicate that page 102d may provide location information for the select data of the read request, and thus 102d may be selected as the destination page linked to page 102a. Multiple versions of a destination page 102d may be maintained. FIG. 1B, for example, illustrates 3 different versions of page 102d, versions 122, 124, and 126. Thus, after read request 142 was received, change notifications indicating one or more changes to page 102d may have been received, generating versions of page 102d that are subsequent to the view of the database requested in the read request, such as version 126.

In order to navigate between current page 102a and 102d, the page versions maintained for 102d may be evaluated, in at least some embodiments, in order to select a version of the destination page that is consistent with the version of the current page 102a. For example, in some embodiments, the latest or most recent (in time) committed version (i.e., version that has been made durable) of the current page from the time of the read request may be determined. In the scenario illustrated in FIG. 1B, the most recently committed version of page 102a at the time associated with read request 142 is version 114. The different versions for page 102 may then be evaluated to determine a version committed at a time less than or equal to the most recently committed version of page 102a, version 114. At read request 142, this may be version 124, which was committed at the same time as version 114. In some embodiments a similar evaluation may be performed starting with version 124 with respect to versions for page 102a, as discussed in more detail with regard to FIGS. 8A and 8B below. A similar evaluation may be made with respect to read request 144. The most recently committed version of current page 102a is still version 114, while the version of page 102d less than or equal to the most recent conversion is also still 124, even though a new version of page 102d, version 126, may have been generated prior to read request 144.

In at least some embodiments, change notifications indicating index structure modifications may be part of the same system transaction. A system transaction may be a transaction that is performed atomically, from a user perspective. Either all of the changes associated with the system transaction are made visible, or none are made visible. A change notification may be designated as the last change to be applied in a system transaction, such that all prior change notifications associated with the system transaction may not be applied or made viewable for servicing a read request until the last indicated change is received. In some embodiments, the last change notification is referred to as a consistency point LSN (CPL).

As result of index structure modifications made by system transactions the page versions for data pages may, in some embodiments, change to a new committed version at the same time. For example, in FIG. 1B version 114 and 124 become committed at the same time as part of the same system transaction, illustrated using the same shading pattern in the interval. Similarly version 126 and version 124 may be a part of the same system transaction, and likewise version 118 and version 126 may be a part of the same system transaction.

Once the version of the destination page is determined, the destination page may be identified as the current page, and the navigation may be performed again. Thus, as illustrated at step 106, the selected version for page 102d is used to select the next link to follow in the index structure, which in this example is illustrated as page 102i. Again, the different versions of page 102i, 132, 134, and 136, may be evaluated to determine the selected version for 102i as the destination page. For example, for read request 142, the most recently committed version of current page 102d is version 124. The version identified as less than or equal to version 124 is version 132 for page 102i.

Navigation steps may be performed at each data page of index structure 100 until a one or more terminal data pages (e.g., a leaf node) are reached, such as illustrated at step 108. In some embodiments, the one or more terminal data pages may include the data for servicing the read request. While in other embodiments, a location, pointer, or link to the data may be included in the one or more terminal data pages.

Please note that FIGS. 1A and 1B illustrate logical representations of data pages, versions of pages, traversals, etc. Various different ways of implementing the illustrated components, whether in hardware and/or software, may be envisioned, and as such, the illustration and accompanying description is not intended to be limiting.

The specification first describes an example network-based database service that includes the disclosed read-only nodes implementing index structure navigations using page versions. Included in the description of the example network-based database service are various aspects of the example network-based database service, such as a database engine, read-only nodes, and a separate distributed database storage service. The specification then describes flowcharts of various embodiments of methods for index structure navigation using page versions for read-only nodes of a distributed database. Afterwards, the specification describes an example system that may implement the disclosed techniques. Various examples are provided throughout the specification.

The systems described herein may, in some embodiments, implement a network-based service that enables clients (e.g., subscribers) to operate a data storage system in a cloud computing environment. In some embodiments, the data storage system may be an enterprise-class database system that is highly scalable and extensible. In some embodiments, queries may be directed to database storage that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

More specifically, the systems described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single primary node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, and/or various space management operations) may be offloaded from the database engine to the storage layer and distributed across multiple nodes and storage devices. For example, in some embodiments, rather than the database engine applying changes to database tables (or data pages thereof) and then sending the modified data pages to the storage layer, the application of changes to the stored database tables (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because redo logs and not modified data pages are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time. Moreover, communications (e.g., a change notification, such as a cache invalidation request) sent from a primary node of the database tier to read-only nodes of the database tier may be asynchronous as well.

As previously noted, in typical large database systems, the entire data set needs to be restored before the database system can be restarted following a failure in the system. In these database systems, following a crash, the system must determine the last point at which it was known that all of the data pages had been flushed to disk (e.g., a checkpoint) and must replay any change logs from that point forward. For example, before the database can be made available to handle incoming queries from client processes, a system process must read in all of the data pages that were changed after the determined checkpoint and apply each of the applicable change log records that had not already been applied to those data pages.

In some embodiments, the database systems described herein may be able to restart the database engine following a failure (e.g., to make the database available to accept and service queries) almost immediately after a database crash, without having to wait for the entire data set to be restored. Instead, queries can be received and serviced while crash recovery is performed lazily by one or more background threads. For example, following a crash, multiple background threads may operate in parallel on different storage nodes to reconstruct data pages from corresponding redo logs. In the meantime, if an incoming query targets a data page that has not yet been reconstructed, the storage layer may be configured to re-create that data page on the fly from the appropriate redo logs.

In general, after being given a piece of data, a primary requirement of a database is that it can eventually give that piece of data back. To do this, the database may include several different components (or tiers), each of which performs a different function. For example, a traditional database may be thought of as having three tiers: a first tier for performing query parsing, optimization and execution; a second tier for providing transactionality, recovery, and durability; and a third tier that provides storage, either on locally attached disks or on network-attached storage. As noted above, previous attempts to scale a traditional database have typically involved replicating all three tiers of the database and distributing those replicated database instances across multiple machines.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may be configured to receive a request specifying what data is to be stored or retrieved, but not how to store or retrieve the data. This tier may perform request parsing and/or optimization (e.g., SQL parsing and optimization), while another tier may be responsible for query execution. In some embodiments, a third tier may be responsible for providing transactionality and consistency of results. For example, this tier may be configured to enforce some of the so-called ACID properties, in particular, the Atomicity of transactions that target the database, maintaining Consistency within the database, and ensuring Isolation between the transactions that target the database. In some embodiments, a fourth tier may then be responsible for providing Durability of the stored data in the presence of various sorts of faults. For example, this tier may be responsible for change logging, recovery from a database crash, managing access to the underlying storage volumes and/or space management in the underlying storage volumes.

Note that the storage service illustrated and described in FIGS. 2-5 is simply an example. Other storage services that are coupled to the database engine and read-only nodes may also be used in various embodiments. For example, read-only nodes may have directly attached storage devices, and/or dedicated network-based storage devices.

In various embodiments, a database instance may include multiple functional components (or layers), each of which provides a portion of the functionality of the database instance. In one such example, a database instance may include a query parsing and query optimization layer, a query execution layer, a transactionality and consistency management layer, and a durability and space management layer. As noted above, in some existing database systems, scaling a database instance may involve duplicating the entire database instance one or more times (including all of the aforementioned layers), and then adding glue logic to stitch them together. In some embodiments, the systems described herein may instead offload the functionality of the durability and space management layer from the database tier to a separate storage layer, and may distribute that functionality across multiple storage nodes in the storage layer.

In some embodiments, the database systems described herein may retain much of the structure of the upper half of the database instance discussed in the example above, but may redistribute responsibility for at least portions of the backup, restore, snapshot, recovery, and/or various space management operations to the storage tier. Redistributing functionality in this manner and tightly coupling log processing between the database tier and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using only metadata manipulation rather than movement or copying of a data page. In some embodiments, the storage layer may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), cancelling or aborting a query, and/or other operations.

In some embodiments, the database tier of a database instance may include a read-write node server, which may also be referred to herein as a read-write node server, that receives read and/or write requests from various client programs (e.g., applications) and/or subscribers (users), then parses them and develops an execution plan to carry out the associated database operation(s). For example, the read-write node may develop the series of steps necessary to obtain results for complex queries and joins. In some embodiments, the read-write node may manage communications between the database tier of the database system and clients/subscribers, as well as communications between the database tier and a separate distributed storage system.

In some embodiments, the read-write node may be responsible for receiving SQL requests from end clients through a JDBC or ODBC interface and for performing SQL processing and transaction management (which may include locking) locally. However, rather than generating data pages locally, the read-write node (or various components thereof) may generate redo log records and may ship them to the appropriate nodes of a separate distributed storage system. In some embodiments, a client-side driver for the distributed storage system may be hosted on the read-write node and may be responsible for routing redo log records to the storage system node (or nodes) that store the segments (or data pages thereof) to which those redo log records are directed. For example, in some embodiments, each segment may be mirrored (or otherwise made durable) on multiple storage system nodes that form a protection group. In such embodiments, the client-side driver may keep track of the nodes on which each segment is stored and may route redo logs to all of the nodes on which a segment is stored (e.g., asynchronously and in parallel, at substantially the same time), when a client request is received. As soon as the client-side driver receives an acknowledgement back from a write quorum of the storage nodes in the protection group (which may indicate that the redo log record has been written to the storage node), it may send an acknowledgement of the requested change to the database tier (e.g., to the read-write node). For example, in embodiments in which data is made durable through the use of protection groups, the read-write node may not be able to commit a transaction until and unless the client-side driver receives a reply from enough storage node instances to constitute a write quorum. Similarly, for a read request directed to a particular segment, the client-side driver may route the read request to some or all of the nodes on which the segment is stored (e.g., asynchronously and in parallel, at substantially the same time). As soon as the client-side driver receives the requested data from a read quorum of the storage nodes in the protection group, it may return the requested data to the database tier (e.g., to the database engine head node).

In some embodiments, the database tier (or more specifically, the database engine head node) may include a cache in which recently accessed data pages are held temporarily. In such embodiments, if a write request is received that targets a data page held in such a cache, in addition to shipping a corresponding redo log record to the storage layer, the database engine may apply the change to the copy of the data page held in its cache. However, unlike in other database systems, a data page held in this cache may not ever be flushed to the storage layer, and it may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different embodiments.

In some embodiments, the database tier may support the use of synchronous or asynchronous read-only nodes (sometimes referred to as read-replicas) in the system, e.g., read-only copies of data on different nodes of the database tier to which read requests can be routed. In such embodiments, if the read-write node for a given database table receives a read request directed to a particular data page, it may route the request to any one (or a particular one) of these read-only copies. Or, in some embodiments, a client read request may be received directly by a read-only node (from a client), without first going through the read-write node. In some embodiments, the client-side driver in the read-write node may be configured to notify these other read-only nodes (e.g., to a client-side driver of those other nodes) about changes by sending change notifications (e.g., changes to system metadata, such as a data dictionary or active transactions list, and or updates and/or invalidations to data pages, such as those data pages cached locally at the read-only node). In response, the read-only node may be configured to perform the notified changes (e.g., such as by invalidating their caches for a specific page or record of the cache or the whole cache, by modifying internal data structures, and/or by updating or modifying values stored within data pages in the database cache maintained at the read-only node).

Figure 6:
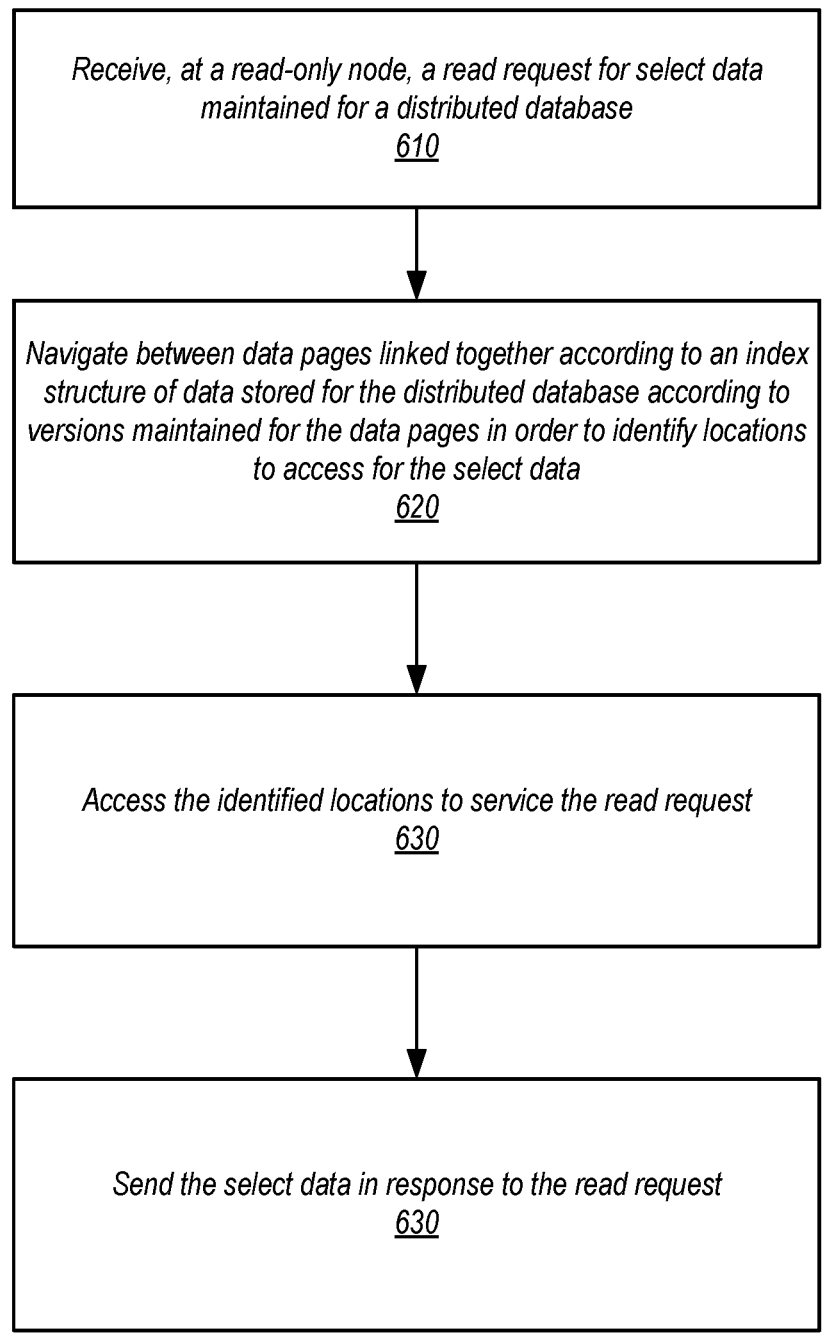
FIG. 6 is a high-level flowchart illustrating a method of processing a read request at a read-only node implementing index structure navigation using page versions, according to some embodiments.

Groups of changes may be associated with a particular system transaction (sometimes referred to as a mini-transaction), such as described below in greater detail with regard to FIG. 6. One of the change notifications sent to the read-only node may be notified as the last change to be applied for a respective system transaction (e.g., a CPL). For reads requests, the read-only nodes may be configured to determine a consistent view of the database to present when servicing a read request, such as based on the identified last change of a system transaction which has been applied. The read request may then be serviced according to the determined consistent view of the database to be presented. For example, in some embodiments, data pages in a database cache on the read-only node may have been invalidated, and the consistent view of the database to be presented may cause the read-only node to retrieve updated copies of updated data pages (or log records of changes to those pages to apply them to the cache) from the storage layer. In some embodiments, the read-only nodes may be configured to receive an indication (e.g., a manifest) of data pages stored in the cache of the database engine head node, which may include pages that are hot on the read and write side. The read-only nodes may be configured to retrieve the hot pages from the storage layer, which may help prepare a read-only node to convert to a read-write node (e.g., if the read-write node fails). In addition, the read-only node may be configured to update an in-memory data structure (e.g., a transaction table) to determine which redo and undo records were inflight (e.g., not received or known by the read-only node) at the time of the read-write node failure. As a result, the converted read-only node may already have a warm cache (e.g., the cache may not have to be rebuilt from scratch) as part of the conversion process.

In some embodiments, the client-side driver(s) running on the read-write node and/or the read-only nodes may expose a private interface to the storage tier. In some embodiments, it may also expose a traditional iSCSI interface to one or more other components (e.g., other database engines or virtual computing services components). In some embodiments, storage for a database instance in the storage tier may be modeled as a single volume that can grow in size without limits, and that can have an unlimited number of IOPS associated with it. When a volume is created, it may be created with a specific size, with a specific availability/durability characteristic (e.g., specifying how it is replicated), and/or with an IOPS rate associated with it (e.g., both peak and sustained). For example, in some embodiments, a variety of different durability models may be supported, and users/subscribers may be able to specify, for their database tables, a number of replication copies, zones, or regions and/or whether replication is synchronous or asynchronous based upon their durability, performance and cost objectives.

In some embodiments, the client side driver(s) (of the read-write node and/or read-only nodes) may maintain metadata about the volume and may directly send asynchronous requests to each of the storage nodes necessary to fulfill read requests and write requests without requiring additional hops between storage nodes. For example, in some embodiments, in response to a request to make a change to a database table, the client-side driver may be configured to determine the one or more nodes that are implementing the storage for the targeted data page, and to route the redo log record(s) specifying that change to those storage nodes. The storage nodes may then be responsible for applying the change specified in the redo log record to the targeted data page at some point in the future. As writes are acknowledged back to the client-side driver, the client-side driver may advance the point at which the volume is durable and may acknowledge commits back to the database tier. As previously noted, in some embodiments, the client-side driver may not ever send data pages to the storage node servers. This may not only reduce network traffic, but may also remove the need for the checkpoint or background writer threads that constrain foreground-processing throughput in previous database systems.

In some embodiments, many read requests may be served by the read-write node cache and/or the by the cache of a particular read-only node. However, write requests may require durability, since large-scale failure events may be too common to allow only in-memory replication. Therefore, the systems described herein may be configured to minimize the cost of the redo log record write operations that are in the foreground latency path by implementing data storage in the storage tier as two regions: a small append-only log-structured region into which redo log records are written when they are received from the database tier, and a larger region in which log records are coalesced together to create new versions of data pages in the background. In some embodiments, an in-memory structure may be maintained for each data page that points to the last redo log record for that page, backward chaining log records until an instantiated data block is referenced. This approach may provide good performance for mixed read-write workloads, including in applications in which reads are largely cached.

In some embodiments, because accesses to the log-structured data storage for the redo log records may consist of a series of sequential input/output operations (rather than random input/output operations), the changes being made may be tightly packed together. It should also be noted that, in contrast to existing systems in which each change to a data page results in two input/output operations to persistent data storage (one for the redo log and one for the modified data page itself), in some embodiments, the systems described herein may avoid this "write amplification" by coalescing data pages at the storage nodes of the distributed storage system based on receipt of the redo log records.

As previously noted, in some embodiments, the storage tier of the database system may be responsible for taking database snapshots. However, because the storage tier implements log-structured storage, taking a snapshot of a data page (e.g., a data block) may include recording a timestamp associated with the redo log record that was most recently applied to the data page/block (or a timestamp associated with the most recent operation to coalesce multiple redo log records to create a new version of the data page/block), and preventing garbage collection of the previous version of the page/block and any subsequent log entries up to the recorded point in time. For example, taking a database snapshot may not require reading, copying, or writing the data block, as would be required when employing an off-volume backup strategy. In some embodiments, the space requirements for snapshots may be minimal, since only modified data would require additional space, although user/subscribers may be able to choose how much additional space they want to keep for on-volume snapshots in addition to the active data set. In different embodiments, snapshots may be discrete (e.g., each snapshot may provide access to all of the data in a data page as of a specific point in time) or continuous (e.g., each snapshot may provide access to all versions of the data that existing in a data page between two points in time). In some embodiments, reverting to a prior snapshot may include recording a log record to indicate that all redo log records and data pages since that snapshot are invalid and garbage collectable, and discarding all database cache entries after the snapshot point. In such embodiments, no roll-forward may be required since the storage system will, on a block-by-block basis, apply redo log records to data blocks as requested and in the background across all nodes, just as it does in normal forward read/write processing. Crash recovery may thereby be made parallel and distributed across nodes.

Figure 2:
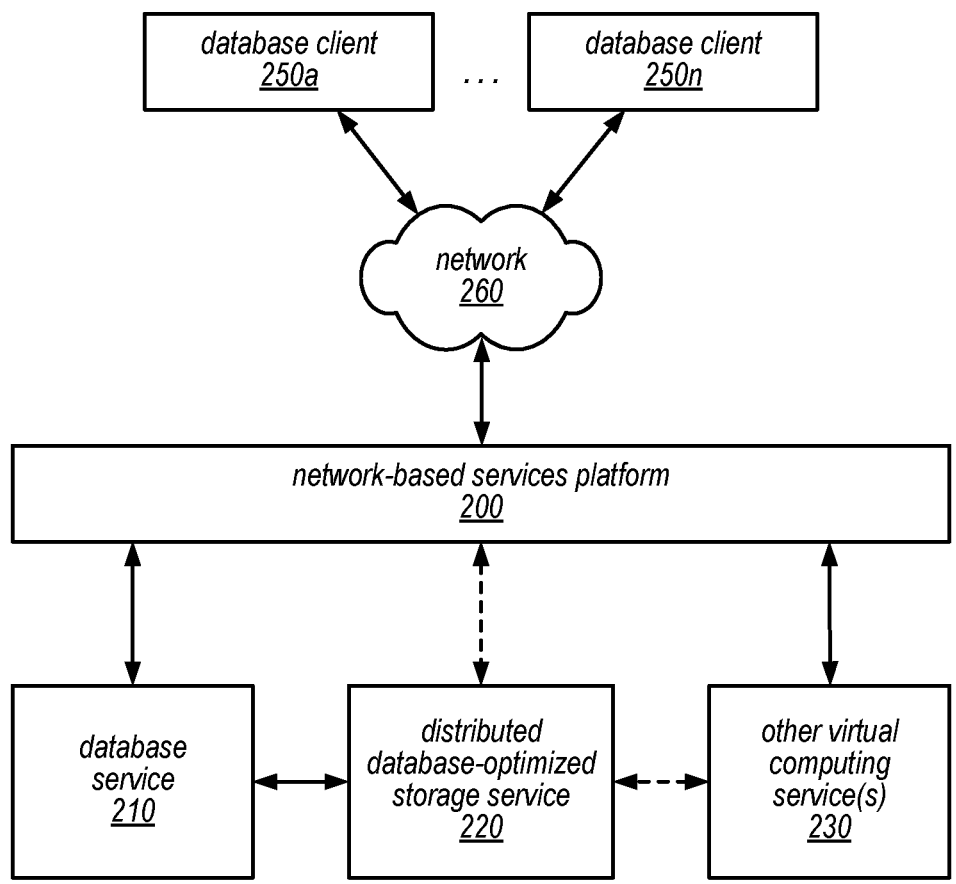
FIG. 2 is a block diagram illustrating a service system architecture that may be configured to implement a network-based database service that implements read-only nodes, according to some embodiments.

One embodiment of a service system architecture that may be configured to implement a web services-based database service is illustrated in FIG. 2. In the illustrated embodiment, a number of clients (shown as database clients 250a-250n) may be configured to interact with a network-based services platform 200 via a network 260. Network-based services platform 200 may be configured to interface with one or more instances of a database service 210 (an instance may include a read-write node and a number of read-only nodes), a distributed storage service 220 and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to network-based services platform 200 via network 260, including requests for database services. For example, a given client 250 may include a suitable version of a web browser, or may include a plug-in module or other type of code module configured to execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application configured to interact directly with web services platform 200. In some embodiments, client 250 may be configured to generate network-based services requests according to a Representational State Transfer (REST)-style web services architecture, a document- or message-based network-based services architecture, or another suitable network-based services architecture.

In some embodiments, a client 250 (e.g., a database service client) may be configured to provide access to network-based storage of database tables to other applications in a manner that is transparent to those applications. For example, client 250 may be configured to integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to network-based services platform 200 may be coordinated by client 250 and the operating system or file system on behalf of applications executing within the operating system environment.

Clients 250 may convey network-based services requests to and receive responses from network-based services platform 200 via network 260. In various embodiments, network 260 may encompass any suitable combination of networking hardware and protocols necessary to establish network-based communications between clients 250 and network-based platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with network-based services platform 200 using a private network rather than the public Internet. For example, clients 250 may be provisioned within the same enterprise as a database service system (e.g., a system that implements database service 210 and/or distributed storage service 220). In such a case, clients 250 may communicate with platform 200 entirely through a private network 260 (e.g., a LAN or WAN that may use Internet-based communication protocols but which is not publicly accessible).

Generally speaking, network-based services platform 200 may be configured to implement one or more service endpoints configured to receive and process network-based services requests, such as requests to access data pages (or records thereof). For example, network-based services platform 200 may include hardware and/or software configured to implement a particular endpoint, such that an HTTP-based network-based services request directed to that endpoint is properly received and processed. In one embodiment, network-based services platform 200 may be implemented as a server system configured to receive network-based services requests from clients 250 and to forward them to components of a system that implements database service 210, distributed storage service 220 and/or another virtual computing service 230 for processing. In other embodiments, network-based services platform 200 may be configured as a number of distinct systems (e.g., in a cluster topology) implementing load balancing and other request management features configured to dynamically manage large-scale network-based services request processing loads. In various embodiments, network-based services platform 200 may be configured to support REST-style or document-based (e.g., SOAP-based) types of network-based services requests.

In addition to functioning as an addressable endpoint for clients' network-based services requests, in some embodiments, network-based services platform 200 may implement various client management features. For example, network-based service platform 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Network-based services platform 200 may also implement financial accounting and billing systems, or may maintain a database of usage data that may be queried and processed by external systems for reporting and billing of client usage activity. In certain embodiments, network-based services platform 200 may be configured to collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, distributed storage service 220 and/or another virtual computing service 230 (or the underlying systems that implement those services).

In some embodiments, network-based services platform 200 may also implement user authentication and access control procedures. For example, for a given network-based services request to access a particular database table, network-based services platform 200 may be configured to ascertain whether the client 250 associated with the request is authorized to access the particular database table. Network-based services platform 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, platform 200 may reject the corresponding network-based services request, for example by returning a response to the requesting client 250 indicating an error condition. Various access control policies may be stored as records or lists of access control information by database service 210, distributed storage service 220 and/or other virtual computing services 230.

It is noted that while network-based services platform 200 may represent the primary interface through which clients 250 may access the features of a database system that implements database service 210, it need not represent the sole interface to such features. For example, an alternate API that may be distinct from a web services interface may be used to allow clients internal to the enterprise providing the database system to bypass network-based services platform 200. Note that in many of the examples described herein, distributed storage service 220 may be internal to a computing system or an enterprise system that provides database services to clients 250, and may not be exposed to external clients (e.g., users or client applications). In such embodiments, the internal "client" (e.g., database service 210) may access distributed storage service 220 over a local or private network, shown as the solid line between distributed storage service 220 and database service 210 (e.g., through an API directly between the systems that implement these services). In such embodiments, the use of distributed storage service 220 in storing database tables on behalf of clients 250 may be transparent to those clients. In other embodiments, distributed storage service 220 may be exposed to clients 250 through network-based services platform 200 to provide storage of database tables or other information for applications other than those that rely on database service 210 for database management. This is illustrated in FIG. 2 by the dashed line between web services platform 200 and distributed storage service 220. In such embodiments, clients of the distributed storage service 220 may access distributed storage service 220 via network 260 (e.g., over the Internet). In some embodiments, a virtual computing service 230 may be configured to receive storage services from distributed storage service 220 (e.g., through an API directly between the virtual computing service 230 and distributed storage service 220) to store objects used in performing computing services 230 on behalf of a client 250. This is illustrated in FIG. 2 by the dashed line between virtual computing service 230 and distributed storage service 220. In some cases, the accounting and/or credentialing services of platform 200 may be unnecessary for internal clients such as administrative clients or between service components within the same enterprise.

Note that in various embodiments, different storage policies may be implemented by database service 210 and/or distributed storage service 220. Examples of such storage policies may include a durability policy (e.g., a policy indicating the number of instances of a database table (or data page thereof) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, distributed storage service 220 may implement a higher durability for redo log records than for data pages.

Figure 3:
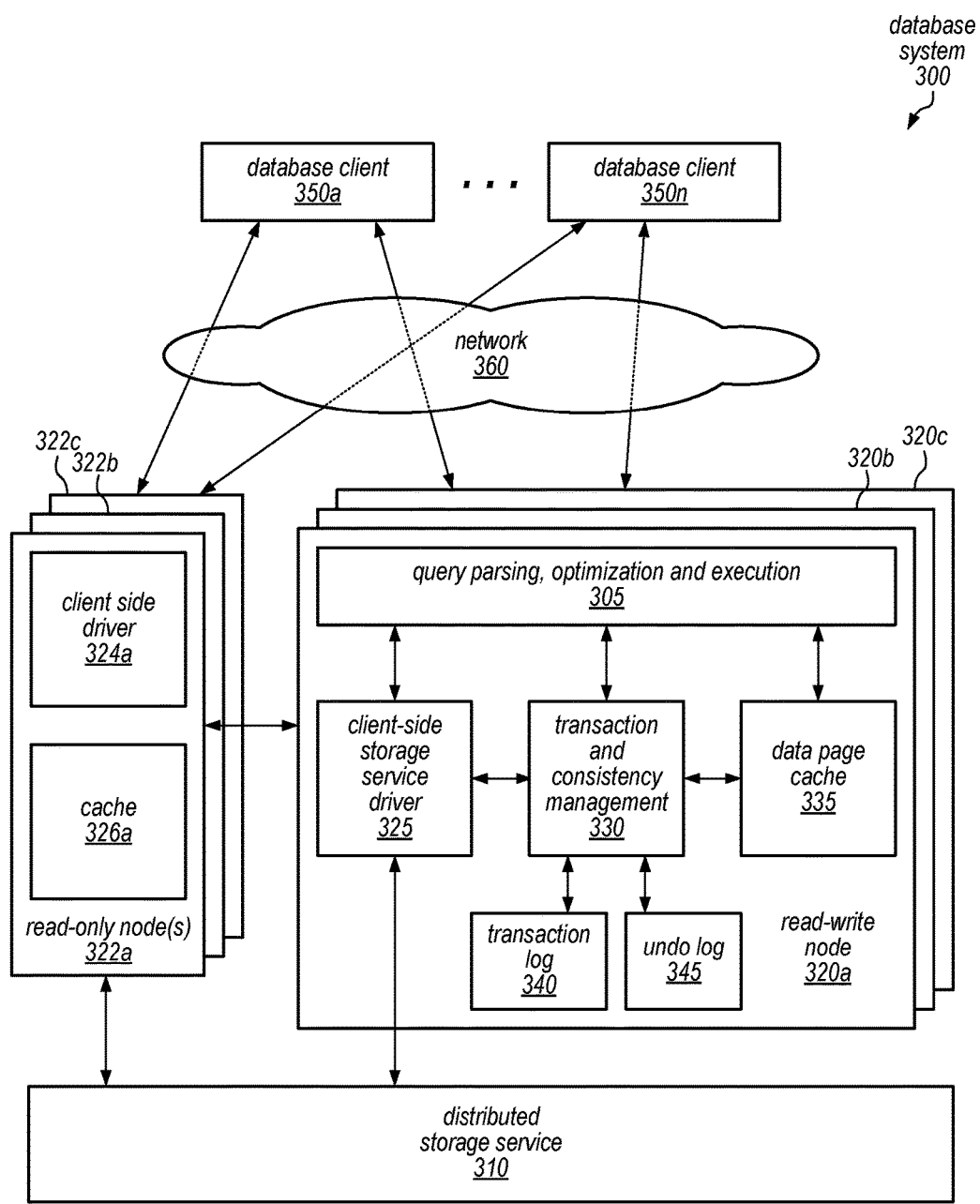
FIG. 3 is a block diagram illustrating various components of a database system configured to use the disclosed read-only nodes, according to some embodiments.

FIG. 3 is a block diagram illustrating various components of a database system that includes a read-write node, read-only nodes, and a separate distributed database storage service, according to one embodiment. In this example, database system 300 includes a respective database read-write node 320 and a plurality of read-only nodes 322a, 322b, and 322c for each of several database tables and a distributed storage service 310 (which may or may not be visible to the clients of the database system, shown as database clients 350a-350n). As illustrated in this example, one or more of database clients 350a-350n may access a read-write node 320 (e.g., read-write node 320a, read-write node 320b, or read-write node 320c, each of which is a component of a respective database instance) and/or a read-only node (e.g., read-only node 322a, 322b, or 322c) via network 360 (e.g., these components may be network-addressable and accessible to the database clients 350a-350n). Note that any number of read-only nodes may be associated with a particular database instance but for ease of illustration and explanation, three read-only nodes are shown in FIG. 3. Distributed storage service 310, which may be employed by the database system to store data pages of one or more database tables (and redo log records and/or other metadata associated therewith) on behalf of database clients 350a-350n, and to perform other functions of the database system as described herein, may or may not be network-addressable and accessible to the storage clients 350a-350n, in different embodiments. For example, in some embodiments, distributed storage service 310 may perform various storage, access, change logging, recovery, and/or space management operations in a manner that is invisible to storage clients 350a-350n.

As previously noted, each database instance may include a single read-write node 320 that receives requests from various client programs (e.g., applications) and/or subscribers (users), then parses them, optimizes them, and develops an execution plan to carry out the associated database operation(s). Also as previously noted, each read-only node may receive read requests (e.g., from various client programs, subscribers, and/or from the read-only node), and may similarly parse such requests, optimize them, and develop an execution plan to carry out the read (e.g., SELECT). In the example illustrated in FIG. 3, a query parsing, optimization, and execution component 305 of read-write node 320a may perform these functions for queries that are received from database client 350a and that target the database instance of which read-write node 320a is a component. In some embodiments, query parsing, optimization, and execution component 305 may return query responses to database client 350a, which may include write acknowledgements, requested data pages (or portions thereof), error messages, and or other responses, as appropriate. As illustrated in this example, read-write node 320a may also include a client-side storage service driver 325, which may route read requests and/or change notifications (e.g., redo log records) to a read-only node and/or various storage nodes within distributed storage service 310, receive write acknowledgements from distributed storage service 310, receive requested data pages from distributed storage service 310, and/or return data pages, error messages, or other responses to query parsing, optimization, and execution component 305 (which may, in turn, return them to database client 350a).

In this example, read-write node 320a includes data page cache 335, in which data pages that were recently accessed (read and/or write) may be temporarily held. As illustrated in FIG. 3, read-write node 320a may also include transaction and consistency management component 330, which may be responsible for providing transactionality and consistency in the database instance of which read-write node 320a is a component. For example, this component may be responsible for ensuring the Atomicity, Consistency, and Isolation properties of the database instance and the transactions that are directed that the database instance. As illustrated in FIG. 3, read-write node 320a may also include transaction log 340 and undo log 345, which may be employed by transaction and consistency management component 330 to track the status of various transactions and roll back any locally cached results of transactions that do not commit.

Note that each of the other read-write nodes 320 illustrated in FIG. 3 (e.g., 320b and 320c) may include similar components and may perform similar functions for queries received by one or more of database clients 350a-350n and directed to the respective database instances of which it is a component.

In various embodiments, each of the read-only nodes 322a, 322b, and 322c may also include components similar to those of the read-write node and/or may be configured to include such components (e.g., upon conversion of a read-only to a read-write node to replace the old read-write node). As shown, each read-only node may include cache 326a and client side driver 324a. Client side driver 324a may be similar to client-side storage service driver 325 of the read-write node. Moreover, communication between the read-write node and the read-only nodes may be communication between client side driver 324a and client-side storage service driver 325. Cache 326a may be similar to data page cache 335 in that it may be configured to store recently accessed data pages. Note that data pages stored in the cache of one read-only node may be different than data pages stored in the cache of another read-only node which may also be different than data pages stored in data page cache 335. Moreover, the actual data stored for a data page in the cache of one read-only node may be different from the actual data stored for the same data page in the cache another read-only node and/or from the actual data for the same data page stored in data page cache 335.

In some embodiments, upon sending a redo log (or undo log) to the storage layer, client-side storage service driver 325 may also be configured to send one or more change notifications to client-side driver 324a at read-only node(s) 322a. Change notifications may be indicate various updates or changes made at read-write node. For example, inserting a new record in a database table may include many different changes, such as allocating new space in a data page for the new record, updating the index structure (e.g., a b-tree) of the database, storing the new data values for the record, and updating system metadata (e.g., the data dictionary) to include information about the new record may each have one or more change notifications to describe the performance of these changes. Different change notification messages may indicate different types of changes that are performed at a read-write node. Change notifications may include invalidation messages, which may indicate one or more data pages that may have modified data values. Change notifications may also include new data values, changes, or pages themselves for modified/updated data pages. The data page changes may be directed toward data pages storing user data (e.g., data directly visible to the database client(s) 350) or toward database service data, such as data pages that make up an index structure used by query parsing, optimization and execution component 305 to determine on or more locations of data pages storing user data for read requests.

When responding to read requests, read-only node(s) 322a may be configured to navigate an index structure for the database based on versions of the pages that make up the index structure in order to determine one or more locations of data requested in a read request. One or more versions of pages may be maintained in cache 326a and/or a buffer pool or log of change notifications. Page versions may also be obtained by requesting a version of a page from distributed storage service 310. For example, as illustrated above in FIG. 1, a read request may be serviced navigating between a current page and a destination page in an index structure without blocking (e.g., locking out) updates or other read requests that may access the same index data pages.

In some embodiments, the distributed storage systems described herein may organize data in various logical volumes, segments, and pages for storage on one or more storage nodes. For example, in some embodiments, each database is represented by a logical volume, and each logical volume is segmented over a collection of storage nodes. Each segment, which lives on a particular one of the storage nodes, contains a set of contiguous block addresses. In some embodiments, each data page is stored in a segment, such that each segment stores a collection of one or more data pages and a change log (also referred to as a redo log) for each data page that it stores. As described in detail herein, the storage nodes may be configured to receive redo log records (which may also be referred to herein as ULRs) and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the database table is being maintained in the database system). For example, in different embodiments, one, two, or three copies of the data or change logs may be stored in each of one, two, or three different availability zones or regions, according to a default configuration, an application-specific durability preference, or a client-specified durability preference.

As used herein, the following terms may be used to describe the organization of data by a distributed storage system, according to various embodiments.

Volume: A volume is a logical concept representing a highly durable unit of storage that a user/client/application of the storage system understands. More specifically, a volume is a distributed store that appears to the user/client/application as a single consistent ordered log of write operations to various user pages of a database table. Each write operation may be encoded in a User Log Record (ULR), which represents a logical, ordered mutation to the contents of a single user page within the volume. As noted above, a ULR may also be referred to herein as a redo log record. Each ULR may include a unique LSN, or Log Sequence Number, which may be an identifier that uses monotonically increasing values to denote an ordering. For example LSN 1 is earlier than LSN 3, which is earlier than LSN6. Note that each number in sequence need not be used. For example, LSNs 1, 2, 3, 4, and 6 may exist but not LSN 5 in some embodiments. Each ULR may be persisted to one or more synchronous segments in the distributed store that form a Protection Group (PG), to provide high durability and availability for the ULR. A volume may provide an LSN-type read/write interface for a variable-size contiguous range of bytes.

In some embodiments, a volume may consist of multiple extents, each made durable through a protection group. In such embodiments, a volume may represent a unit of storage composed of a mutable contiguous sequence of Volume Extents. Reads and writes that are directed to a volume may be mapped into corresponding reads and writes to the constituent volume extents. In some embodiments, the size of a volume may be changed by adding or removing volume extents from the end of the volume.

Segment: A segment is a limited-durability unit of storage assigned to a single storage node. More specifically, a segment provides limited best-effort durability (e.g., a persistent, but non-redundant single point of failure that is a storage node) for a specific fixed-size byte range of data. This data may in some cases be a mirror of user-addressable data, or it may be other data, such as volume metadata or erasure coded bits, in various embodiments. A given segment may live on exactly one storage node. Within a storage node, multiple segments may live on each SSD, and each segment may be restricted to one SSD (e.g., a segment may not span across multiple SSDs). In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes. In some embodiments, a segment may provide an LSN-type read/write interface for a fixed-size contiguous range of bytes (where the size is defined at creation). In some embodiments, each segment may be identified by a Segment UUID (e.g., a universally unique identifier of the segment).

Storage page: A storage page is a block of memory, generally of fixed size. In some embodiments, each page is a block of memory (e.g., of virtual memory, disk, or other physical memory) of a size defined by the operating system, and may also be referred to herein by the term "data block". More specifically, a storage page may be a set of contiguous sectors. It may serve as the unit of allocation in SSDs, as well as the unit in log pages for which there is a header and metadata. In some embodiments, and in the context of the database systems described herein, the term "page" or "storage page" may refer to a similar block of a size defined by the database configuration, which may typically a multiple of 2, such as 4096, 8192, 16384, or 32768 bytes.

Log page: A log page is a type of storage page that is used to store log records (e.g., redo log records or undo log records). In some embodiments, log pages may be identical in size to storage pages. Each log page may include a header containing metadata about that log page, e.g., metadata identifying the segment to which it belongs. Note that a log page is a unit of organization and may not necessarily be the unit of data included in write operations. For example, in some embodiments, during normal forward processing, write operations may write to the tail of the log one sector at a time.

Log Records: Log records (e.g., the individual elements of a log page) may be of several different classes. For example, User Log Records (ULRs), which are created and understood by users/clients/applications of the storage system, may be used to indicate changes to user data in a volume. Control Log Records (CLRs), which are generated by the storage system, may contain control information used to keep track of metadata such as the current unconditional volume durable LSN (VDL). Null Log Records (NLRs) may in some embodiments be used as padding to fill in unused space in a log sector or log page. In some embodiments, there may be various types of log records within each of these classes, and the type of a log record may correspond to a function that needs to be invoked to interpret the log record. For example, one type may represent all the data of a user page in compressed format using a specific compression format; a second type may represent new values for a byte range within a user page; a third type may represent an increment operation to a sequence of bytes interpreted as an integer; and a fourth type may represent copying one byte range to another location within the page. In some embodiments, log record types may be identified by GUIDs (rather than by integers or enums), which may simplify versioning and development, especially for ULRs.

Payload: The payload of a log record is the data or parameter values that are specific to the log record or to log records of a particular type. For example, in some embodiments, there may be a set of parameters or attributes that most (or all) log records include, and that the storage system itself understands. These attributes may be part of a common log record header/structure, which may be relatively small compared to the sector size. In addition, most log records may include additional parameters or data specific to that log record type, and this additional information may be considered the payload of that log record. In some embodiments, if the payload for a particular ULR is larger than the user page size, it may be replaced by an absolute ULR (an AULR) whose payload includes all the data for the user page. This may enable the storage system to enforce an upper limit on the size of the payload for ULRs that is equal to the size of user pages.

Note that when storing log records in the segment log, the payload may be stored along with the log header, in some embodiments. In other embodiments, the payload may be stored in a separate location, and pointers to the location at which that payload is stored may be stored with the log header. In still other embodiments, a portion of the payload may be stored in the header, and the remainder of the payload may be stored in a separate location. If the entire payload is stored with the log header, this may be referred to as in-band storage; otherwise the storage may be referred to as being out-of-band. In some embodiments, the payloads of most large AULRs may be stored out-of-band in the cold zone of log (which is described below).

User pages: User pages are the byte ranges (of a fixed size) and alignments thereof for a particular volume that are visible to users/clients of the storage system. User pages are a logical concept, and the bytes in particular user pages may or not be stored in any storage page as-is. The size of the user pages for a particular volume may be independent of the storage page size for that volume. In some embodiments, the user page size may be configurable per volume, and different segments on a storage node may have different user page sizes. In some embodiments, user page sizes may be constrained to be a multiple of the sector size (e.g., 4 KB), and may have an upper limit (e.g., 64 KB). The storage page size, on the other hand, may be fixed for an entire storage node and may not change unless there is a change to the underlying hardware.

Data page: A data page is a type of storage page that is used to store user page data in compressed form. In some embodiments every piece of data stored in a data page is associated with a log record, and each log record may include a pointer to a sector within a data page (also referred to as a data sector). In some embodiments, data pages may not include any embedded metadata other than that provided by each sector. There may be no relationship between the sectors in a data page. Instead, the organization into pages may exist only as an expression of the granularity of the allocation of data to a segment.

Storage node: A storage node is a single virtual machine that on which storage node server code is deployed. Each storage node may contain multiple locally attached SSDs, and may provide a network API for access to one or more segments. In some embodiments, various nodes may be on an active list or on a degraded list (e.g., if they are slow to respond or are otherwise impaired, but are not completely unusable). In some embodiments, the client-side driver may assist in (or be responsible for) classifying nodes as active or degraded, for determining if and when they should be replaced, and/or for determining when and how to redistribute data among various nodes, based on observed performance.

SSD: As referred to herein, the term "SSD" may refer to a local block storage volume as seen by the storage node, regardless of the type of storage employed by that storage volume, e.g., disk, a solid-state drive, a battery-backed RAM, an NVMRAM device (e.g., one or more NVDIMMs), or another type of persistent storage device. An SSD is not necessarily mapped directly to hardware. For example, a single solid-state storage device might be broken up into multiple local volumes where each volume is split into and striped across multiple segments, and/or a single drive may be broken up into multiple volumes simply for ease of management, in different embodiments. In some embodiments, each SSD may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 4:
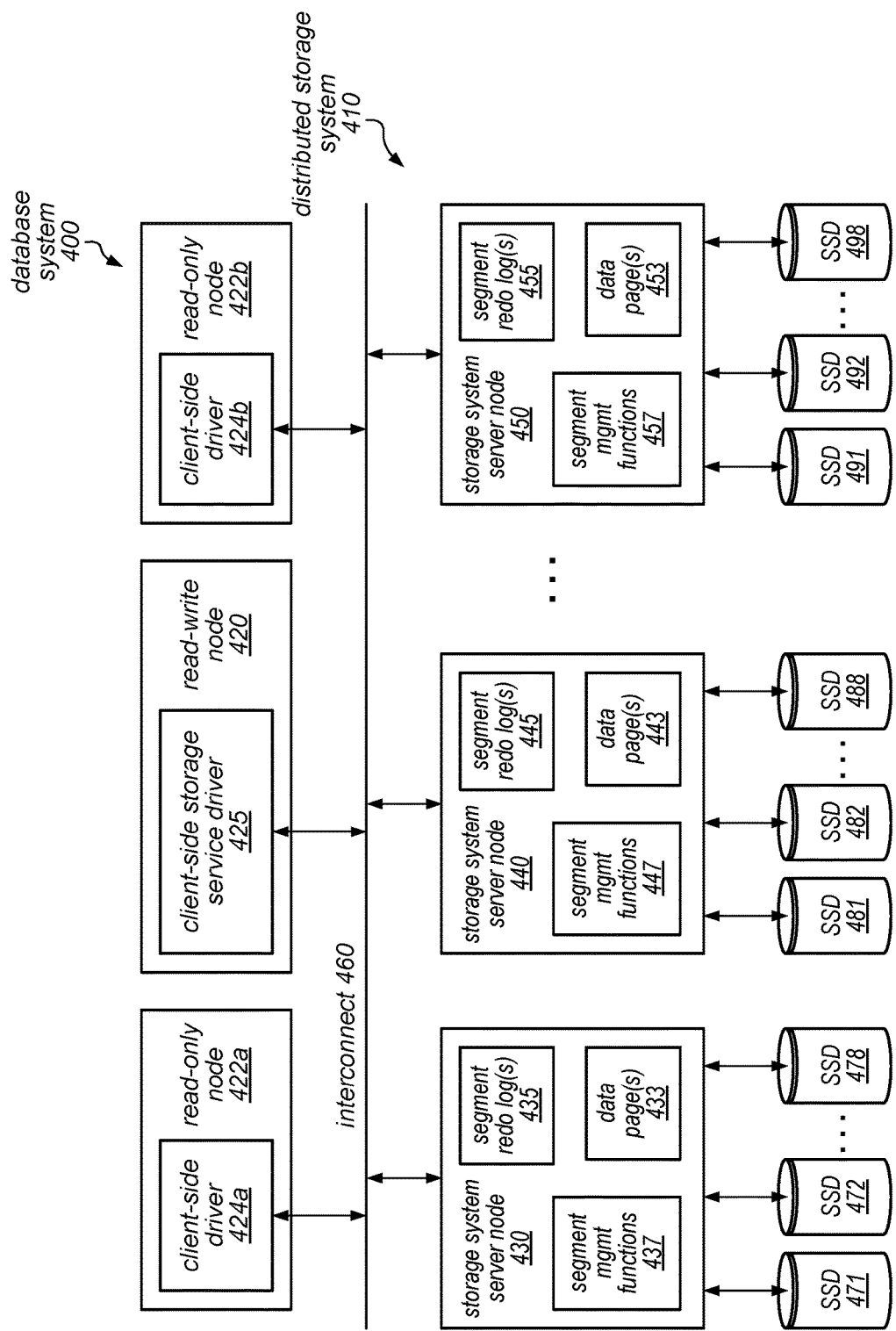
FIG. 4 is a block diagram illustrating a distributed storage system configured to use the disclosed read-only nodes, according to some embodiments.

One embodiment of a distributed storage system is illustrated by the block diagram in FIG. 4. In this example, a database system 400 includes a distributed storage system 410, which communicates with a read-write node 420, read-only node 422a, and read-only node 422b (only two read-only nodes are shown for ease of illustration/explanation) over interconnect 460. As in the example illustrated in FIG. 3, read-write node 420 may include a client-side storage service driver 425 and read-only nodes 422a and 422b may each include a client-side driver 424a and 424b, respectively. In this example, distributed storage system 410 includes multiple storage system server nodes (including those shown as 430, 440, and 450), each of which includes storage for data pages, redo logs for the segment(s) it stores, system metadata for read-write node 420 (e.g., data dictionary data, transaction table data etc.) and hardware and/or software configured to perform various segment management functions. For example, each storage system server node may include hardware and/or software configured to perform at least a portion of any or all of the following operations: replication (locally, e.g., within the storage node), coalescing of redo logs to generate data pages, crash recovery, and/or space management (e.g., for a segment). Each storage system server node may also have multiple attached storage devices (e.g., SSDs) on which data blocks may be stored on behalf of clients (e.g., users, client applications, and/or database service subscribers).

In the example illustrated in FIG. 4, storage system server node 430 includes data page(s) 433, segment redo log(s) 435, segment management functions 437, and attached SSDs 471-478. Again note that the label "SSD" may or may not refer to a solid-state drive, but may more generally refer to a local block storage volume, regardless of its underlying hardware. Similarly, storage system server node 440 includes data page(s) 443, segment redo log(s) 445, segment management functions 447, and attached SSDs 481-488; and storage system server node 450 includes data page(s) 453, segment redo log(s) 455, segment management functions 457, and attached SSDs 491-498.

As previously noted, in some embodiments, a sector is the unit of alignment on an SSD and may be the maximum size on an SSD that can be written without the risk that the write will only be partially completed. For example, the sector size for various solid-state drives and spinning media may be 4 KB. In some embodiments of the distributed storage systems described herein, each and every sector may include have a 64-bit (8 byte) CRC at the beginning of the sector, regardless of the higher-level entity of which the sector is a part. In such embodiments, this CRC (which may be validated every time a sector is read from SSD) may be used in detecting corruptions. In some embodiments, each and every sector may also include a "sector type" byte whose value identifies the sector as a log sector, a data sector, or an uninitialized sector. For example, in some embodiments, a sector type byte value of 0 may indicate that the sector is uninitialized.

Figure 5:
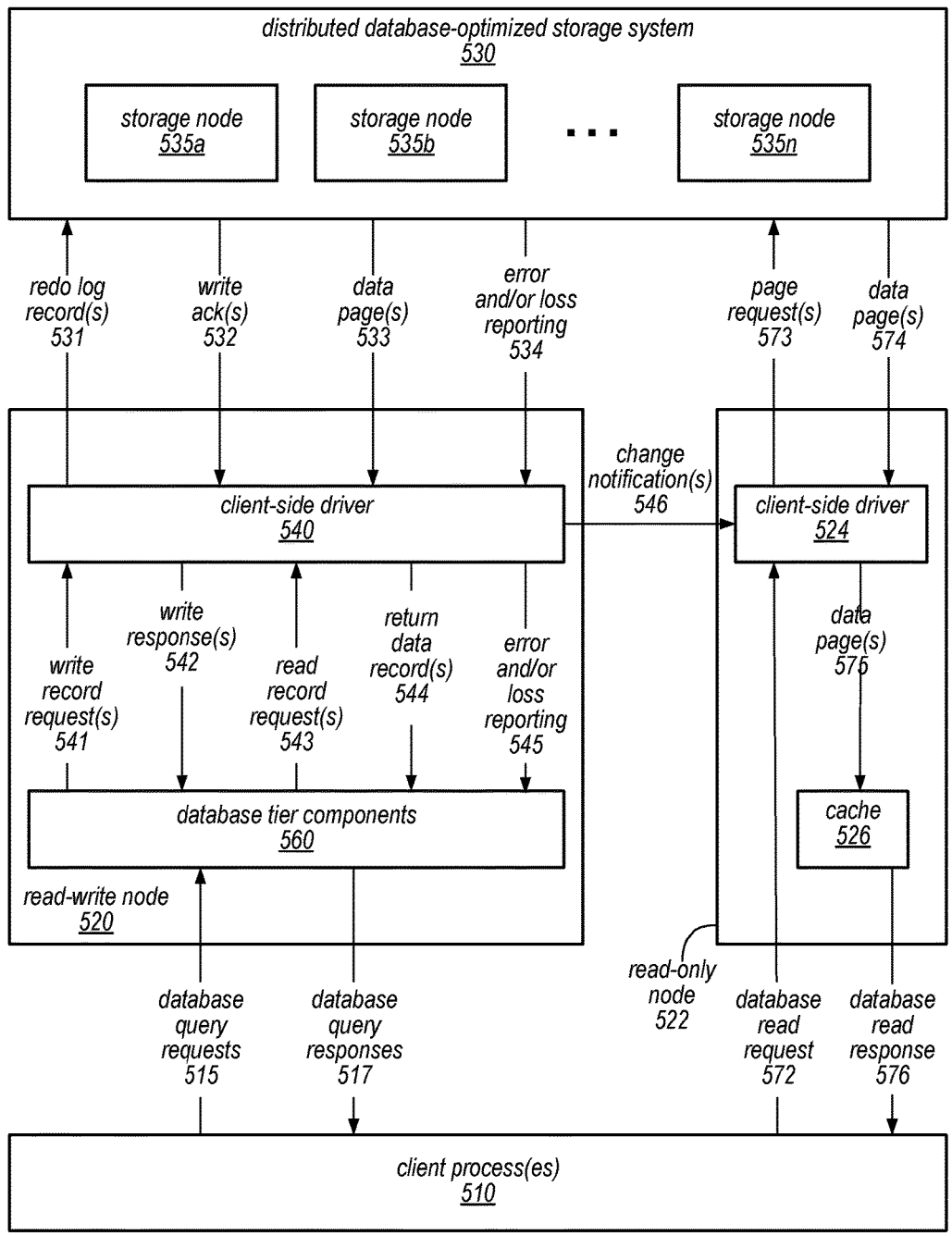
FIG. 5 is a block diagram illustrating the use of a separate distributed storage system in a database system configured to use the disclosed read-only nodes, according to one embodiment.

FIG. 5 is a block diagram illustrating the use of a separate distributed storage system in a database system, according to one embodiment. In this example, one or more client processes 510 may store data to one or more database tables maintained by a database system that includes a database engine 520 and a distributed storage system 530. In the example illustrated in FIG. 5, database engine 520 includes database tier components 560 and client-side driver 540 (which serves as the interface between distributed storage system 530, database tier components 560, and read-only node 522). In some embodiments, database tier components 560 may perform functions such as those performed by query parsing, optimization and execution component 305 and transaction and consistency management component 330 of FIG. 3, and/or may store data pages, transaction logs and/or undo logs (such as those stored by data page cache 335, transaction log 340 and undo log 345 of FIG. 3).

In this example, one or more client processes 510 may send database query requests 515 (which may include read and/or write requests targeting data stored on one or more of the storage nodes 535a-535n) to database tier components 560, and may receive database query responses 517 from database tier components 560 (e.g., responses that include write acknowledgements and/or requested data). Each database query request 515 that includes a request to write to a data page may be parsed and optimized to generate one or more write record requests 541, which may be sent to client-side driver 540 for subsequent routing to distributed storage system 530. In this example, client-side driver 540 may generate one or more redo log records 531 corresponding to each write record request 541, and may send them to specific ones of the storage nodes 535 of distributed storage system 530. In some embodiments, for write requests, client-side driver 540 may send change notifications 546 (e.g., a notification of changes to data pages, such as the new data values for data pages comprising the index structure for the data, themselves as indicated by the one or more redo log records 531 or cache invalidation messages, and/or changes to system metadata, such as data structures that indicate the layout and/or definition of the database and/or in-flight transaction data, such as the states of and entries of active transactions at read-write node 520) to client-side driver 524 of read-only node 522. FIG. 6, discussed below, provides further description of change notifications 546 as they relate index structure modifications. Distributed storage system 530 may return a corresponding write acknowledgement 532 for each redo log record 531 to database engine 520 (specifically to client-side driver 540). Client-side driver 540 may pass these write acknowledgements to database tier components 560 (as write responses 542), which may then send corresponding responses (e.g., write acknowledgements) to one or more client processes 510 as one of database query responses 517.

In this example, each database query request 515 that includes a request to read a data page may be parsed and optimized to generate one or more read record requests 543, which may be sent to clients-side driver 540 for subsequent routing to distributed storage system 530. In this example, client-side driver 540 may send these requests to specific ones of the storage nodes 535 of distributed storage system 530, and distributed storage system 530 may return the requested data pages 533 to database engine 520 (specifically to client-side driver 540). Client-side driver 540 may send the returned data pages to the database tier components 560 as return data records 544, and database tier components 560 may then send the data pages to one or more client processes 510 as database query responses 517. Note that certain read and write requests may be made to a cache (e.g., data page cache 335) of database engine, in addition to, or instead of being made to distributed storage system 530. As part of parsed and optimizing certain read requests, some, or all, of the read query plan may be passed to read-only node 522 for performing the read.

In some embodiments, various error and/or data loss messages 534 may be sent from distributed storage system 530 to database engine 520 (specifically to client-side driver 540). These messages may be passed from client-side driver 540 to database tier components 560 as error and/or loss reporting messages 545, and then to one or more client processes 510 along with (or instead of) a database query response 517.

In some embodiments, client process(es) 510 may submit database read request 572 directly to read-only node 522 to query the database. For a request for non-stale cached data, read-only node may retrieve the requested data from cache 526 and return it to client process(es) as database read response 576. As part of processing read requests, read-only node 522 may implement the various different methods and techniques described below with regard to FIGS. 6-8B. For a request for a data record that is present in cache 526 as stale data or for a data record that is not present in cache 526, client-side driver 524 may send page request(s) 573 to distributed storage system 530 and the requested data page (s) 574 may be returned to read-only node 522 and then provided to client process(es) 510 as database read response 576. In order to obtain a particular version of a data page, page requests 573 may also be sent for a particular version of a data page. In one embodiment, data page(s) 574 may be routed through client-side driver 524 of read-only node 522 and the data page(s) may be stored in cache 526 and replace the stale cached data or replace some other data that is determined as cold data (e.g., is accessed less frequently than other cached data).

Note that in various embodiments, the API calls and responses between database engine 520 and distributed storage system 530 (e.g., APIs 531-534) and/or the API calls and responses between client-side driver 540 and database tier components 560 (e.g., APIs 541-545) and/or API calls and responses between read-only node 522 and distributed storage system 530 (e.g., APIs 573-574) and/or API calls and responses between client-side driver 524 and cache 526 (e.g., APIs 575 and 547) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C# and Perl to support integration with database engine 520 and/or distributed storage system 530.

As illustrated above in FIG. 5, write requests (or other updates) received for a database may be performed by a read-write node, with change notifications 546 being sent to one or more read-only nodes 522. In various embodiments, write requests may be part of larger updates to a database (e.g., increase values for every record in a column of a database table by 1). In many embodiments, change notifications 546 may be streamed to read-only nodes 522 as read-write node 520 is performing the various changes of the update. By asynchronously streaming change notifications, read-only node 522 may perform the indicated changes as they are received without waiting to perform changes in a short period of time (e.g., when a read request is received). In this way, read-only nodes may catch-up to changes made at read-write node 520 with little or no lag time. Some change notifications may be marked or identified as CPL, which may indicate that all change notifications between the prior CPL and the newly received CPL may now be made visible.

As noted above, in some embodiments, the functional components of a database system may be partitioned between those that are performed by the database engine and those that are performed in a separate, distributed storage system. In one specific example, in response to receiving a request from a client process (or a thread thereof) to insert something into a database table (e.g., to update a single data block by adding a record to that data block), one or more components of the primary node may perform query parsing, optimization, and execution, and may send each portion of the query to a transaction and consistency management component. The transaction and consistency management component may ensure that no other client process (or thread thereof) is trying to modify the same row at the same time. For example, the transaction and consistency management component may be responsible for ensuring that this change is performed atomically, consistently, durably, and in an isolated manner in the database. For example, the transaction and consistency management component may work together with the client-side storage service driver of the primary node to generate a redo log record to be sent to one of the nodes in the distributed storage service and to send it to the distributed storage service (along with other redo logs generated in response to other client requests) in an order and/or with timing that ensures the ACID properties are met for this transaction. Upon receiving the redo log record (which may be considered an "update record" by the storage service), the corresponding storage node may update the data block, and may update a redo log for the data block (e.g., a record of all changes directed to the data block). In some embodiments, the database engine may be responsible for generating an undo log record for this change, and may also be responsible for generating a redo log record for the undo log, both of which may be used locally (in the database tier) for ensuring transactionality. However, unlike in traditional database systems, the systems described herein may shift the responsibility for applying changes to data blocks to the storage system (rather than applying them at the database tier and shipping the modified data blocks to the storage system).

FIGS. 2-5 discussed above provide various examples of a distribute database service and distributed storage service that my implement index structure navigation using page versions for read-only nodes. FIG. 6 a high-level flowchart illustrating a method of processing a read request at a read-only node implementing index structure navigation using page versions, according to some embodiments. Various different read-only, replicas, slaves, or secondary nodes may implement the various techniques discussed below with regard to FIGS. 6-8B.

As indicated at 610, a read request for select data maintained for a distributed database may be received at a read-only node, in various embodiments. A read request, for example, may include one or more predicate values or other indicators which may be parsed, evaluated, or examined to identify select data to be retrieved. For example, a read request may request records from a database table that are within a certain range of key values. To determine one or more locations where the select data resides, an index structure of the data may be maintained. A replica or copy of some or all of the index structure may be maintained, in some embodiments, at the read-only node. For example, an index structure may be multiple data pages linked together that store the locations (e.g., pointers, addresses, page identifiers, etc. . . . ). One or more of the data pages of the index structure may be cached at the read-only node in order to quickly access the data page for navigating the index structure. Tree index structures, such as a b-tree, may store the root page as well as many of the various branch pages in a cache of data pages maintained at the read-only node. In this way, those data pages of the index structure that are frequently used in navigating the index structure, such as the root node, may not have to be retrieved from block-based storage, such as from the distributed storage service illustrated in FIGS. 2-5. As noted above, in some embodiments, multiple index structures may be maintained for the distributed database. A different version of the database table sorted according to the different ones of the multiple index structures may be maintained. For example, one version of a database table may be sorted by a customer identifier, while another version of the database table may be sorted by product number. Some index structures for a database table may be implemented over multiple table columns, creating a multi-column index. Some index structures may be directed toward a primary index key or other single column/type.

In at least some embodiments, one or more change notifications may be generated at a read-write node and streamed or sent to read-only nodes. The change notifications may indicate index structure modifications performed at the read-write node. For example, a write request performed at the read-write node may involve performing a system transaction to update the value of a user data page according to a requested value in the write request, and updating the index structure to reflect the additional value in the data page. In response to receiving change notifications, other versions of data pages may be updated to include the new versions of data pages indicated in the change notifications. For example, in some embodiments, change notifications may be buffered or stored so that they may be applied lazily (i.e. as needed) or may be applied when received, and then stored (e.g. like undo records) in order to be able to generate a prior version of the page. In at least some embodiments, change notifications may be log records (e.g., redo log records) which indicate changes to the data pages. These log records may differ from the ULRs described above in that they may describe changes to data pages, such as data pages implementing the index structure, that are not user data pages. The log records may be appended to a log structure for change notifications maintained at the read-only node.

Figure 7:
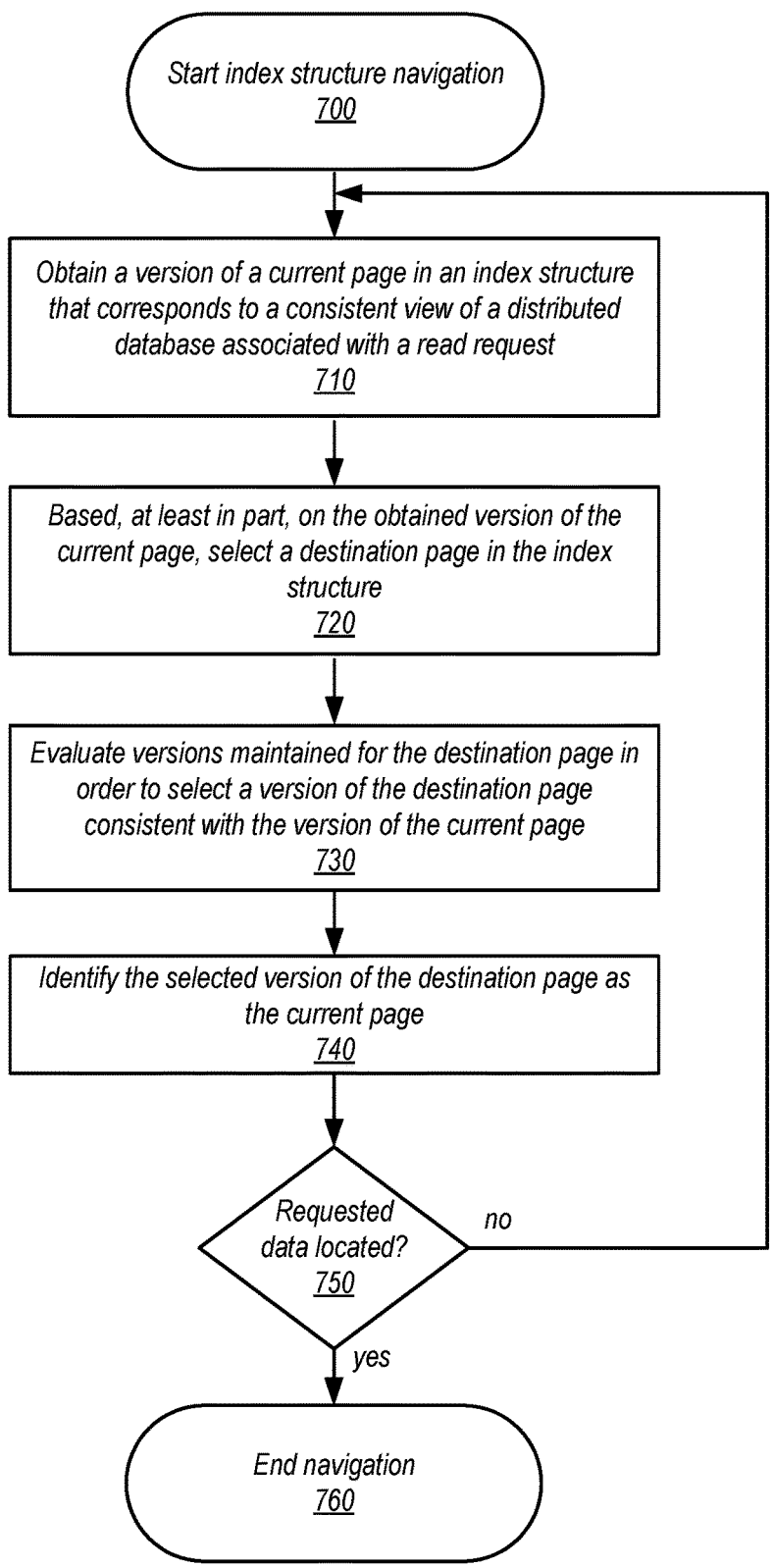
FIG. 7 is a high-level flowchart illustrating a method of navigating an index structure based on page versions, according to some embodiments.

The data pages of the index structure may be navigated according to different page versions maintained for the data pages in order to identify data pages to access the select data, as indicated at 620. In at least some embodiments, one of the data pages navigate has multiple maintained versions, and one of the multiple maintained versions is selected that is consistent with a consistent view of the distributed database associated with the read request, such as described below with regard to FIG. 7. Index structure navigation may be performed in various different ways, which may be dependent on the schema of the index structure. For instance, a hash indexing scheme may have relatively few data pages that may need to be accessed, while some hash index structures may navigate between multiple data pages. As various different types of index structures may be implemented, the previous examples are not intended to be limiting. In at least some embodiments, navigating between data pages of an index structure based, at least in part, on versions of the pages may allow other processes, such as processes servicing other read requests or processes applying change notifications indicating updates to the same pages in the index structure, to access, update or change index structure data pages. In other words, in some embodiments index structure navigation may be performed without locking data pages, thereby blocking access to the data pages. By maintaining multiple versions of a page, such as by implementing the buffer of change notifications to be applied to generate different versions of pages maintained in a database cache or other location at the read-only node, a read-only node may quickly respond to read requests without possibly becoming stuck in deadlock or other blocking scenarios that stall or prevent the processing of read requests. FIG. 7 is a high-level flowchart illustrating a method of navigating an index structure based on page versions, according to some embodiments.

As indicated at 700, index structure navigation may begin. A root page, or other starting page may be identified according to the scheme of the index structure as the current page for navigation. A version of a current page that corresponds to the consistent view of a distributed database associated with a read request may be obtained, as indicated at 710, in some embodiments. Obtaining the version of the page may, as mentioned above, be performed by applying one or more change notifications to a previous version of a page to generate the desired version of the page. For example, in some embodiments, change notifications may be one or more log records, which may be stored at the read only node (e.g., appended to a log or other data structure). The one or more log records may be applied to a previous version of the page, such as a version of the page maintained in a database cache at the read-only node, in order to generate the desired version. In some embodiments, the versions of pages may not be maintained at the read-only node, or the desired version may be older than a window of versions maintained at the read-only node. A distributed storage system, such as distributed storage service discussed above with regard to FIGS. 2-5, may maintain different versions for each page. The read-only node may request from the distributed storage system the desired version of the page, and receive the desired version of the page in response.

For each navigation between pages, a destination page may be selected, as indicated at 720, based, at least in part, on the obtained version of the current page that corresponds to a consistent view of the distributed database associated with the read request. The current page, as noted above may contain links, pointers, or other indicators to other data pages in the index structure. Using this information, a destination page may be selected (e.g., page 10133 provides locations for data addresses 1000-10000. The current page being navigated from may have one or more versions maintained for it. Different ones of these versions may link or point to different pages. Selecting a destination page based on a version of the current page that corresponds to the read request may prevent the navigation from attempting to navigate to a data page inconsistent with the consistent view of the database associated with the read request. Consider the scenario where version 100 of the current page, such as a root page of an index structure, is associated with a view of the database at which the read request is received (e.g. is valid at the time the read request is received or a time associated with the read request). Subsequent change notifications indicate that the root page has been modified to version 101 in order to link to different and/or additional pages. When navigating from the root page, the read-only node may use the linking information from version 100 instead of version 101, so that incorrect link information of version 101 may not lead to the selection of the wrong destination page.

FIG. 8B provides further examples of determining the version of a page associated with a consistent view of the distributed database associated with the read request. For example, in some embodiments, a read request may be associated with a particular LSN, such as LSN 12. Thus, if the current page is P1, then the version with correcting link information may be the version of P1 committed at LSN 11. The shaded area of T1 in column P1 illustrates that version of the page that is generated/maintained after performing transaction T1. Similarly, a read request associated with LSN 18 may identify the version of the current page to be at LSN 17, where the version of the page applying transaction T3 was committed. Also note that FIG. 8B illustrates that different page versions may be generate as result of the same or different transactions. Although both pages P1 and P2 were affected by transaction T1, P2, for example, had a new page version generated by transaction T2, while P1 was not affected by transaction T2. Rather P1 was affected by transaction T3, which P2 was not subject to. The illustrations of different transactions and versions of pages is meant to highlight that different pages may be updated with new page versions independently. Some pages may have many different page versions that occur frequently. Conversely, some pages may have subsequent page versions occur relatively few times and at infrequent intervals. As index structure modifications that cause the new page versions may be performed at various different times and in a variety of different ways according to the index structure used, the illustration of FIG. 8B is not intended to be limiting as to the various other combinations of timings, transactions, or versions.

Figure 8A:
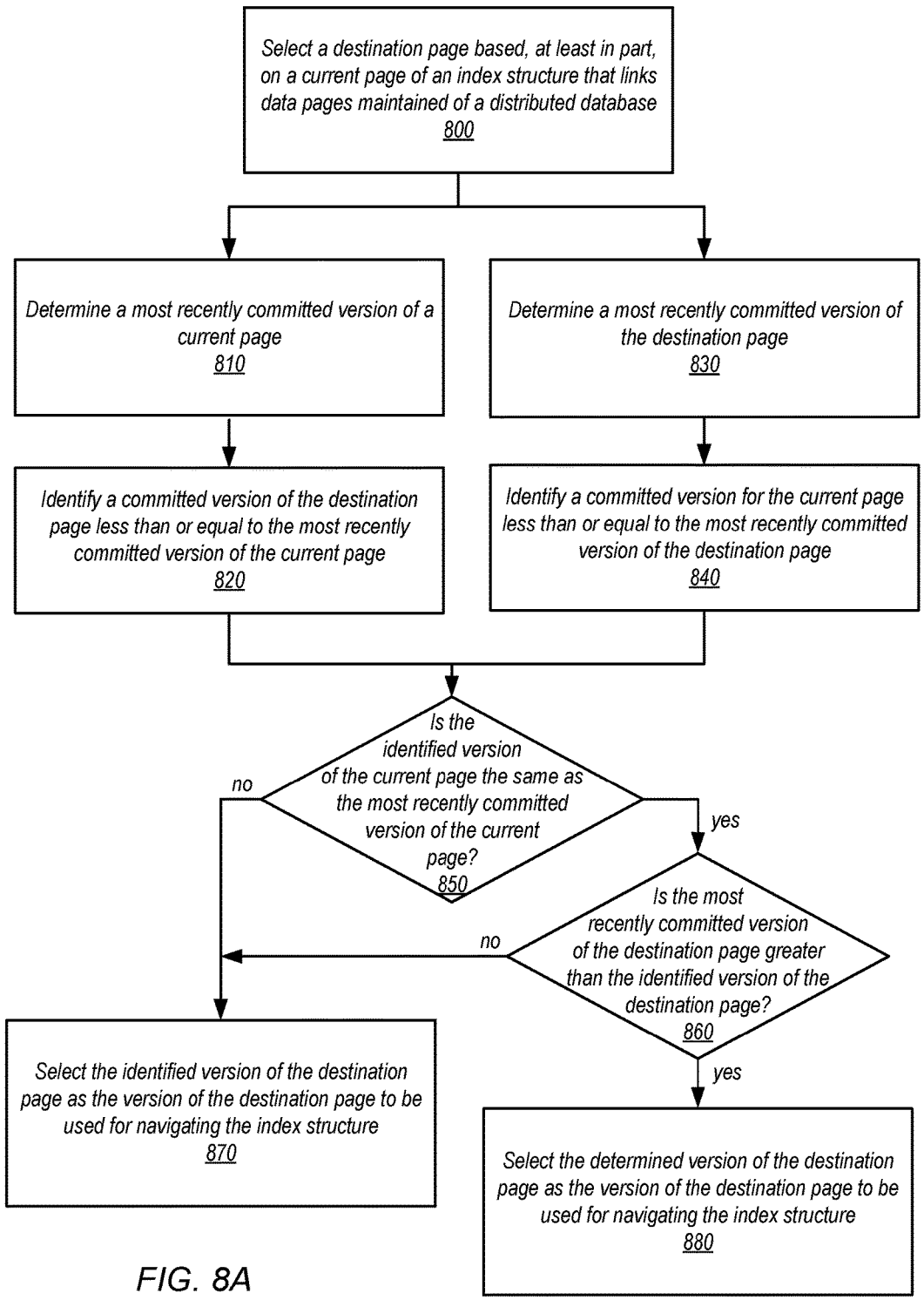
FIG. 8A is a high-level flowchart illustrating a method of evaluating page versions to determine a version of a destination page consistent with a version of a current page, according to some embodiments.
Figure 8B:
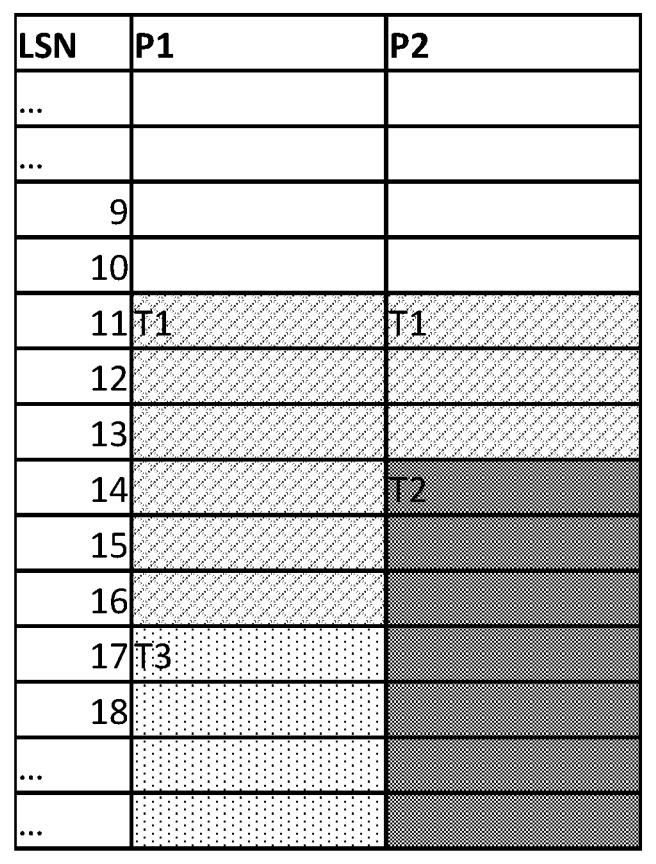

In various embodiments, the versions maintained for the destination page may then be evaluated in order to select a version of the destination page consistent with the version of the current page, as indicated at 730. By examining versions of the destination page that are valid at the same time as the current page's version, a version of the destination page may be selected. In some embodiments, more than one version of the destination page may be eligible to be selected. FIG. 8A illustrates various techniques for evaluation versions of destination pages in order to perform index structure navigation using page versions.

As indicated at 800, a destination page may be selected. A most recently committed version of the current page may be determined, as indicated at 810. For instance, in FIG. 8B, if a read request is associated with LSN 15, and P2 is the current page, the most recently committed version of P2 would be LSN 14 (as the effects of transaction T2 took effect at LSN 14) as it is the most recently committed version of the data page with respect to the LSN associated with the read request (i.e. most recently committed on or before LSN 15). Determining the most recently committed version for a data page may be implemented in a variety of different ways. For example, data structures maintained for each data page, such as in-memory data structures, may list the LSNs of different committed versions of a data page. In at least some embodiments, change notifications may be log records stored in a buffer at the read only node. The log records may include links to prior log records that are applied to the same data page. Thus, by scanning the buffer of log records, the different versions of a given data page may be identified and the most recently committed determined.

As indicated at 820, a committed version of the destination page less than or equal to the most recently committed version of the current page may be identified. Thus, returning to FIG. 8B and the example read request associated with LSN 15, the most recently committed version of the current page is at LSN 11. The most recently committed version of page P2 (the destination page) is also 11. Although a subsequent version of P2 has been committed at LSN 14 as part of transaction T2, the comparison between versions of P1 and P2 may occur at commit points, not at the time associated with the read request. Thus, LSN 11 of P2 is less than or equal to LSN 11 of P1. In at least some embodiments, the version of P2 committed at LSN may be selected as the version of the destination page. However, in other embodiments, further evaluations may be made, as illustrated by elements 830-880.

A most recently committed version of the destination page may be determined, in some embodiments, as indicated at 830. For example, as mentioned above, if a read request is associated with LSN 15, the most recently committed version of P2 (the destination page) would be LSN 14 (the effects of transaction T2 were committed at LSN 14) as it is the most recently committed version of the data page with respect to the LSN associated with the read request (i.e. most recently committed on or before LSN 15). A committed version for the current page (P1) less than or equal to the most recently committed version of the destination page 840 may also be identified, as indicated at 840. Similar to element 820 discussed above, the committed version of P1 is determined with respect to the LSN of the most recently committed version of the destination page, LSN 14, and not the read request, LSN 15. Thus, the committed version of P1 less than or equal to LSN 14 is LSN 11.

If the identified committed version of the current page, as performed at 840, is not the same as the most recently committed version of the current page, as determined at 810, then most recently committed version of the destination page, as determined at 830, is not consistent with the version of the current page, and, as indicated by the negative exit from 850, the version of the destination page determined at 820 should be selected as the version of the destination page to be used for navigating the index structure, as indicated at 870. Alternatively, if as in the example given above for the read request at LSN 15, wherein the two versions of the current page are the same, then the most recently committed version of the destination page P2, as determined at 830, is greater than the identified committed version of the destination page, as identified at 820, then following the positive exit from element 860, the determined most recently committed version of the destination page may be selected to be used to navigate the index structure, as indicated at 880. Thus, the most recently committed version of P2 at LSN 14 may be the version used, even though it is subsequent to the version of P1. Alternatively, the version of P2 at T1 may also be used, as noted above using a simplified evaluation.

Once the version of the destination page is selected, at 730, the selected version of the destination page may be identified as the current page, as indicated at 740. If the selected version locates (or stores the requested data), as indicated at 750, the index structure navigation may be complete. If not, then as indicated by the negative exit at 750, the navigation process may begin again at 710. The navigation technique may be repeated multiple times until one or more locations of the requested data are identified (e.g., by reaching leaf nodes of a tree index structure).

As indicated at 630, one or more identified locations may be accessed. Navigations may be performed across one or more pages of the index structure until terminal data pages, such as leaf nodes of a tree structure are reached. These terminal data pages may identify the locations to be accessed for servicing the read request and/or may include the data in the data page. Some index structures, for instance, may not store actual data values in data pages of the index structure, but may instead contain addresses, pointers, or some other descriptor of where select data can be found. By contrast, other index structures may include user data in terminal (e.g., leaf nodes) or other data pages of the index structure. Once the select data is obtained from the one or more locations, it may be sent back in response to the read request, as indicated at 640.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Figure 9:
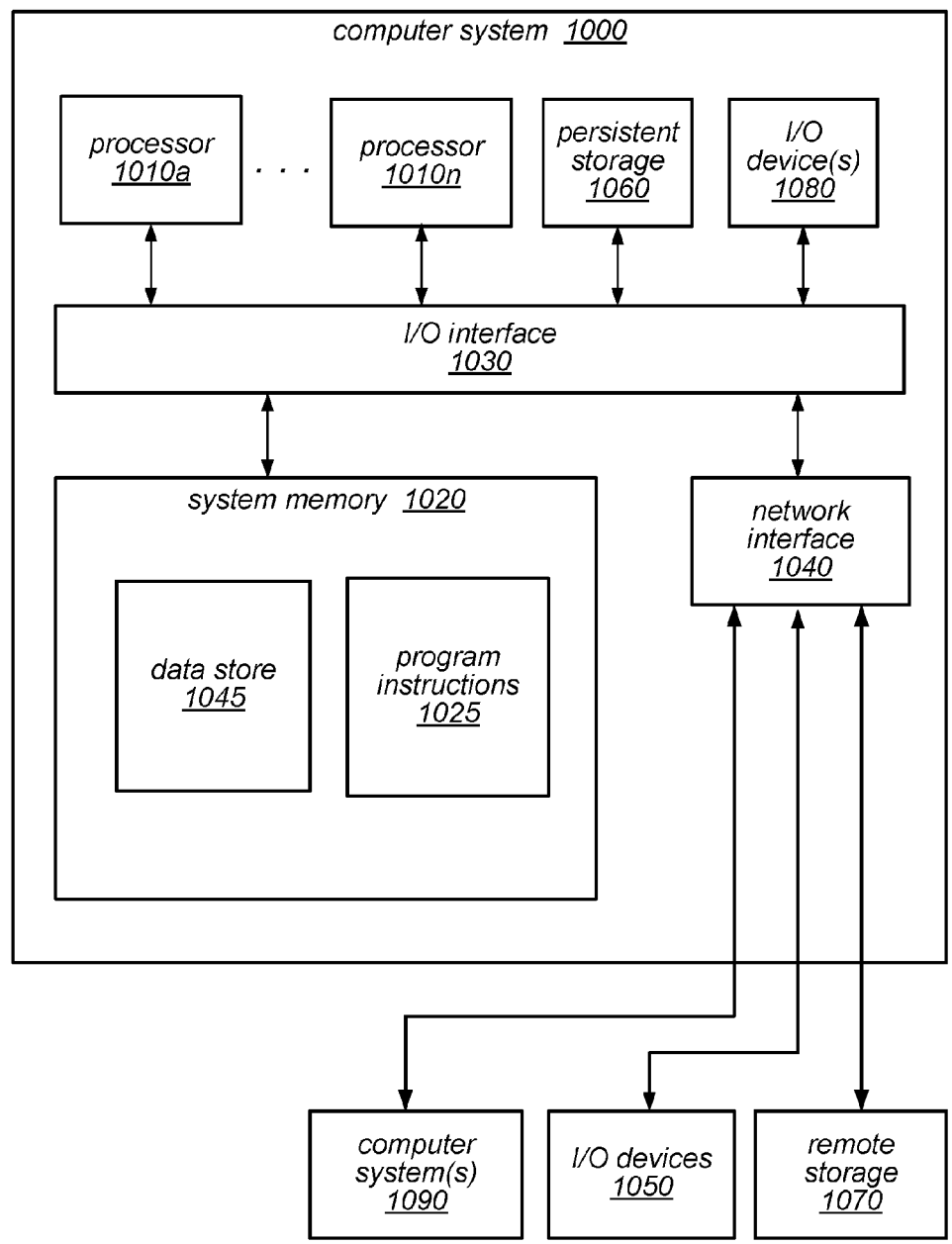
FIG. 9 is a block diagram illustrating an example computer system, according to various embodiments.

FIG. 9 is a block diagram illustrating a computer system configured to implement at least a portion of the database systems described herein, according to various embodiments. For example, computer system 1000 may be configured to implement a read-write (or master/leader/primary) node of a database tier, a read-only node (or read replica), or one of a plurality of storage nodes of a separate distributed storage system that stores database tables and associated metadata on behalf of clients of the database tier, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a read-write node of a database tier, one of a plurality of read-only nodes, or one of a plurality of storage nodes of a separate distributed storage system that stores database tables and associated metadata on behalf of clients of the database tier, in various embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a primary node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, data pages, data records, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
at least one processor; and
a memory to store program instructions that, if executed, cause the at least one processor to perform a method, comprising:
receiving a read request for select data at a read-only node of a distributed database that stores data across a plurality of different data pages linked together according to an index structure;
in response to receiving the read request:
identifying a consistent view of the distributed database associated with the read request;
for individual ones of the plurality of data pages:
selecting a version from among a plurality of versions of the data page based on the selected version being consistent with the consistent view associated with the read request; and
identifying, based on the selected version of the data page, another of the data pages according to a link of the index structure;
determining one or more locations to access for the select data according to the selected versions of the data pages; and
accessing the one or more locations in order to service the read request.

2. The system of claim 1, wherein the method further comprises generating the version of the data page based on applying one or more change notifications received from a read-write node of the distributed database.

3. The system of claim 1, wherein the plurality of different data pages are maintained at a data store that is remote from the read-only node, and wherein the method further comprises obtaining the version of the data page from the data store.

4. The system of claim 1, wherein selecting the version maintained for the data page comprises:
for at least one of the one or more data pages:
determining a most recently committed version for a first data page selected to be read that is linked to a second data page;
identifying a committed version for the second data page that is the same or prior to the most recently committed version for the first data page; and
selecting the committed version of the second data page that is the same or prior to the most recently committed version for the first data page as the respective version of the second data page to read.

5. The system of claim 1, wherein selecting the version maintained for the data page comprises:
for at least one of the one or more data pages:
determining a most recently committed version for a second data page that is linked to by a first data page that is selected to be read;
identifying a committed version for the first data page that is the same or prior to the most recently committed version for the second data page;
determining that the committed version for the first data page is the same as the most recently committed version for the data page; and
in response to determining that the committed version for the first data page is the same as the most recently committed version for the data page, selecting the most recently committed version of the second data page as the respective version of the second data page to read.

6. The system of claim 1, wherein the plurality of different data pages are stored in a log-structured data store and wherein respective versions of the data pages correspond to respective Logical Sequence Numbers (LSNs) of the log-structured data store.

7. The system of claim 1, wherein the distributed database is implemented as part of a network-based database service, wherein the read request is received from a client of the network-based database service via an Application Programming Interface (API) for the network-based database service, and wherein the method further comprises sending one or more results of the read request to the client.

8. A method, comprising:
receiving a read request for select data at a read-only node of a distributed database that stores data across a plurality of different data pages linked together according to an index structure;
in response to receiving the read request:
identifying a consistent view of the distributed database associated with the read request;
for individual ones of the plurality of data pages:
selecting a version from among a plurality of versions of the data page based on the selected version being consistent with the consistent view associated with the read request; and
identifying, based on the selected version of the data page, another of the data pages according to a link of the index structure;
determining one or more locations to access for the select data according to the selected versions of the data pages; and
accessing the one or more locations in order to service the read request.

9. The method of claim 8, further comprising generating the version of the data page based on applying one or more change notifications received from a read-write node of the distributed database.

10. The method of claim 8, wherein the plurality of different data pages are maintained at a data store that is remote from the read-only node, and wherein the method further comprises obtaining the version of the data page from the data store.

11. The method of claim 8, wherein selecting the version maintained for the data page comprises:
for at least one of the one or more data pages:
determining a most recently committed version for a first data page selected to be read that is linked to a second data page;
identifying a committed version for the second data page that is the same or prior to the most recently committed version for the first data page; and
selecting the committed version of the second data page that is the same or prior to the most recently committed version for the first data page as the respective version of the second data page to read.

12. The method of claim 8, wherein selecting the version maintained for the data page comprises:
for at least one of the one or more data pages:
determining a most recently committed version for a second data page that is linked to by a first data page that is selected to be read;
identifying a committed version for the first data page that is the same or prior to the most recently committed version for the second data page;
determining that the committed version for the first data page is the same as the most recently committed version for the data page; and
in response to determining that the committed version for the first data page is the same as the most recently committed version for the data page, selecting the most recently committed version of the second data page as the respective version of the second data page to read.

13. The method of claim 8, wherein the plurality of different data pages are stored in a log-structured data store and wherein respective versions of the data pages correspond to respective Logical Sequence Numbers (LSNs) of the log-structured data store.

14. The method of claim 8, wherein the distributed database is implemented as part of a network-based database service, wherein the read request is received from a client of the network-based database service via an Application Programming Interface (API) for the network-based database service, and wherein the method further comprises sending one or more results of the read request to the client.

15. A non-transitory computer-readable storage medium, storing program instructions that when executed by one or more computing devices cause the one or more computing devices to implement:
receiving a read request for select data at a read-only node of a distributed database that stores data across a plurality of different data pages linked together according to an index structure;
in response to receiving the read request:
identifying a consistent view of the distributed database associated with the read request;
for individual ones of the plurality of data pages:

selecting a version from among a plurality of versions of the data page based on the selected version being consistent with the consistent view associated with the read request; and identifying, based on the selected version of the data page, another of the data pages according to a link of the index structure;

determining one or more locations to access for the select data according to the selected versions of the data pages; and accessing the one or more locations in order to service the read request.

16. The non-transitory computer readable storage medium of claim 15, wherein the program instructions cause the one or more computing devices to further implement generating the version of the data page based on applying one or more change notifications received from a read-write node of the distributed database.

17. The non-transitory computer readable storage medium of claim 15, wherein the plurality of different data pages are maintained at a data store that is remote from the read-only node, and wherein the program instructions cause the one or more computing devices to further implement obtaining the version of the data page from the data store.

18. The non-transitory computer readable storage medium of claim 15, wherein, in selecting the version maintained for the data page, the program instructions cause the one or more computing devices to implement:

for at least one of the one or more data pages:
    determining a most recently committed version for a first data page selected to be read that is linked to a second data page;
    identifying a committed version for the second data page that is the same or prior to the most recently committed version for the first data page; and
    selecting the committed version of the second data page that is the same or prior to the most recently committed version for the first data page as the respective version of the second data page to read.

19. The non-transitory computer readable storage medium of claim 15, wherein, in selecting the version maintained for the data page, the program instructions cause the one or more computing devices to further implement:

for at least one of the one or more data pages:
    determining a most recently committed version for a second data page that is linked to by a first data page that is selected to be read;
    identifying a committed version for the first data page that is the same or prior to the most recently committed version for the second data page;
    determining that the committed version for the first data page is the same as the most recently committed version for the data page; and
    in response to determining that the committed version for the first data page is the same as the most recently committed version for the data page, selecting the most recently committed version of the second data page as the respective version of the second data page to read.

20. The non-transitory computer readable storage medium of claim 15, wherein the distributed database is implemented as part of a network-based database service, wherein the read request is received from a client of the network-based database service via an Application Programming Interface (API) for the network-based database service, and wherein the program instructions cause the one or more computing devices to further implement sending one or more results of the read request to the client.

* * * * *